(12) United States Patent
Segall et al.

(10) Patent No.: US 12,270,194 B2
(45) Date of Patent: Apr. 8, 2025

(54) RELOCATABLE HABITAT UNIT SIMULATING A REAL BUILDING STRUCTURE

(71) Applicant: Strategic Operations, Inc., San Diego, CA (US)

(72) Inventors: Stuart C. Segall, La Jolla, CA (US); Kit Lavell, San Diego, CA (US)

( * ) Notice: Subject to any disclaimer, the term of this patent is extended or adjusted under 35 U.S.C. 154(b) by 734 days.

(21) Appl. No.: 17/483,289

(22) Filed: Sep. 23, 2021

(65) Prior Publication Data

US 2022/0010541 A1    Jan. 13, 2022

Related U.S. Application Data

(60) Continuation-in-part of application No. 16/847,535, filed on Apr. 13, 2020, now Pat. No. 11,149,430, which is a continuation-in-part of application No. 16/000,394, filed on Jun. 5, 2018, now abandoned, which is a continuation-in-part of application No.
(Continued)

(51) Int. Cl.
| | |
|---|---|
| *E04B 1/00* | (2006.01) |
| *E04B 1/343* | (2006.01) |
| *E04H 1/12* | (2006.01) |
| *G09B 9/00* | (2006.01) |
| *E04B 1/61* | (2006.01) |

(52) U.S. Cl.
CPC ...... *E04B 1/34321* (2013.01); *E04B 1/34315* (2013.01); *E04B 1/34326* (2013.01); *E04B 1/34384* (2013.01); *E04H 1/1205* (2013.01); *G09B 9/003* (2013.01); *E04B 1/6183* (2013.01)

(58) Field of Classification Search
CPC ........ E04B 1/00; E04B 1/343; E04B 1/34321; E04B 1/34326; E04B 1/34384; E04B 2001/34389; E04B 1/001; E04B 1/6162; E04B 1/02; E04B 1/61; E04H 1/005; E04H 1/1205; E04C 2/30
See application file for complete search history.

(56) References Cited

U.S. PATENT DOCUMENTS

| | | |
|---|---|---|
| 2,838,592 A | 6/1958 | Feketics |
| 4,456,647 A | 6/1984 | Schonfelder et al. |

(Continued)

FOREIGN PATENT DOCUMENTS

DE          2418924          4/2006

*Primary Examiner* — Phi D A
(74) *Attorney, Agent, or Firm* — Enrique Monteagudo, Esq.

(57) ABSTRACT

A field-deployable construction set for the assembly of a Relocatable Habitat Unit (RHU) and associated panels, used for simulating real world environments without costly construction expenses. The various panels, supports, and accessories used to construct an RHU may be interchangeable and readily modified in the field with minimal tools, further providing significant options for reconfiguration of floor, ceiling, and wall panels without having to disassemble the structure. The exterior of the lightweight panels may be customizable to provide a realistic environment for high quality training in a versatile system that is deployable by truck or aircraft and can be assembled with only a single tool. The RHU or components thereof may simulate a real building structure both visually and in a non-visual domain such as via electromagnetic sensors.

19 Claims, 26 Drawing Sheets

Related U.S. Application Data

14/881,440, filed on Oct. 13, 2015, now Pat. No. 9,988,806, and a continuation-in-part of application No. 14/667,408, filed on Mar. 24, 2015, now Pat. No. 10,036,157, said application No. 14/881,440 is a continuation of application No. 14/217,216, filed on Mar. 17, 2014, now Pat. No. 9,157,249, said application No. 14/667,408 is a division of application No. 13/843,707, filed on Mar. 15, 2013, now Pat. No. 9,016,002, and a continuation-in-part of application No. 13/843,735, filed on Mar. 15, 2013, now abandoned, which is a continuation-in-part of application No. 12/043,759, filed on Mar. 6, 2008, now Pat. No. 8,677,698, said application No. 13/843,707 is a continuation-in-part of application No. 12/043,759, filed on Mar. 6, 2008, now Pat. No. 8,677,698.

(60) Provisional application No. 61/800,838, filed on Mar. 15, 2013.

(56) References Cited

U.S. PATENT DOCUMENTS

| | | | | |
|---|---|---|---|---|
| 5,222,894 | A * | 6/1993 | Cabana | G09B 9/003 |
| | | | | 434/29 |
| 5,713,178 | A * | 2/1998 | Sturgill | E04C 2/384 |
| | | | | 52/800.1 |
| 7,830,672 | B1 | 11/2010 | Kitchen | |
| 11,276,323 | B1 * | 3/2022 | Kirchner | G09B 9/00 |
| 11,414,915 | B1 * | 8/2022 | Cummings | G09B 19/00 |
| 11,670,190 | B1 * | 6/2023 | Hollister | G06V 20/20 |
| | | | | 434/365 |
| 2008/0302027 | A1 | 12/2008 | Appleford | |
| 2009/0167971 | A1 | 7/2009 | Powers et al. | |
| 2009/0223161 | A1 * | 9/2009 | Segall | E04B 1/61 |
| | | | | 52/749.1 |
| 2010/0294558 | A1 | 11/2010 | Mitsui et al. | |
| 2013/0042556 | A1 * | 2/2013 | Armijo | E04B 5/023 |
| | | | | 52/309.4 |
| 2016/0200034 | A1 * | 7/2016 | Quanshan | E04F 15/105 |
| | | | | 428/141 |
| 2018/0286288 | A1 * | 10/2018 | Di Donato | A63J 5/025 |
| 2018/0328056 | A1 * | 11/2018 | Collins | E04B 1/24 |
| 2019/0010692 | A1 * | 1/2019 | Segall | E04C 2/30 |
| 2019/0304178 | A1 * | 10/2019 | Lasnier | G06T 17/20 |
| 2020/0055289 | A1 * | 2/2020 | Cheng | B32B 3/02 |
| 2021/0381225 | A1 * | 12/2021 | Ramos | E04B 1/34331 |
| 2022/0205242 | A1 * | 6/2022 | Malinowski | E04C 2/322 |
| 2023/0283915 | A1 * | 9/2023 | Taylor | G09B 25/04 |
| | | | | 348/159 |

* cited by examiner

RELOCATABLE HABITAT UNIT SIMULATING A REAL BUILDING STRUCTURE

CROSS-REFERENCE TO RELATED APPLICATIONS

This application is a continuation-in-part of and claims the benefit of priority to currently pending U.S. patent application Ser. No. 16/847,535, filed Apr. 13, 2020 and entitled "Relocatable Habitat Unit"; which is a continuation-in-part of U.S. patent application Ser. No. 16/000,394, filed Jun. 5, 2018 and entitled "Relocatable Habitat Unit", now abandoned.

U.S. patent application Ser. No. 16/000,394 is a continuation-in-part and claims the benefit of priority to U.S. patent application Ser. No. 14/667,408, filed on Mar. 24, 2015, entitled "Relocatable Habitat Unit," and issued as U.S. Pat. No. 10,036,157 on Jul. 31, 2018; which in turn claims the benefit of priority to both (1) U.S. patent application Ser. No. 13/843,707 (DIV), filed on Mar. 15, 2013, entitled "Relocatable Habitat Unit", and issued on Apr. 28, 2015 as U.S. Pat. No. 9,016,002, and (2) U.S. patent application Ser. No. 13/843,735 (CIP), entitled "Relocatable Habitat Unit Having Radio Frequency Interactive Walls", also filed on Mar. 15, 2013, currently abandoned; both of which in turn claim the benefit of priority to U.S. patent application Ser. No. 12/043,759, filed on Mar. 8, 2008, entitled "Relocatable Habitat Unit," and issued as U.S. Pat. No. 8,677,698 on Mar. 25, 2014, the contents of all which are incorporated herein by reference in their entirety.

U.S. patent application Ser. No. 16/000,394 is also a continuation-in-part of and claims the benefit of priority to U.S. patent application Ser. No. 14/881,440, filed Oct. 13, 2015, entitled "Relocatable Habitat Unit", and issued as U.S. Pat. No. 9,988,806 on Jun. 5, 2018; which is a continuation of and claims the benefit of priority to U.S. patent application Ser. No. 14/217,216, filed Mar. 17, 2014, entitled "Relocatable Habitat Unit", and issued as U.S. Pat. No. 9,157,249 on Oct. 13, 2015; which claims the benefit of priority to U.S. provisional patent application No. 61/800,838, filed Mar. 15, 2013 and entitled "Relocatable Habitat Unit", the contents of all which are incorporated herein by reference in their entirety.

BACKGROUND OF THE INVENTION

Technical Field

The present invention pertains generally to Relocatable Habitat Units (RHUs) for use in simulating an environment for a military combat training scenario. More particularly, the present invention pertains to an RHU that can be assembled and disassembled on-site, using panels that can be maneuvered, positioned and interconnected by no more than two men.

Related Art

Military training should be conducted in an environment that will simulate anticipated combat operations as accurately as practical. For a comprehensive training program, this can require the ability and flexibility to relocate and set-up several different types of training environments. In general, training sites may need to selectively simulate either an urban, suburban or an open terrain environment.

For a training site, the realism that can be attained when simulating a particular environment can be clearly enhanced by introducing indigenous persons (i.e. actors) into the training scenario. Further, in addition to the indigenous persons, urban and suburban environments can be made even more realistic when trainees are confronted by obstacles, such as buildings (e.g. habitats). In most instances, such structures can be relatively modest. Nevertheless, their integration into the training scenario requires planning.

Providing realistic buildings for a training environment requires the collective consideration of several factors. For one, the buildings need to present a visual perception that is accurate for the particular training scenario. Stated differently, they need to "look the part." For another, it is desirable that structures assembled on the training site be capable of disassembly for relocation to another training site and subsequent use. Such use of state-of-the-art movie industry special effects, role players, proprietary techniques, training scenarios, facilities, mobile structures, sets, props, and equipment all contribute to a realistic training model and serve to increase the quality of training.

For military mountain locations such as the Marine Corps Mountain Warfare Center, near Bridgeport, Calif., the 8,000 foot elevation is accessible only by four-wheel drive vehicles, while some mountains such as those in Fort Irwin, Calif., are accessible only by helicopter. Additionally, due to regulations, the nature of the military compound, and the environment, only non-permanent structures may be placed on the Marine Corps Mountain Warfare Center. With this last point in mind, the ability to easily assemble and disassemble a building used as a training aide is a key consideration.

Heretofore, military combat training scenarios have been conducted either on open terrain, or at locations where there have been pre-existing buildings or other structures. The alternative has been to bring prefabricated components of buildings to a training site, and then assemble the components to create the building. Typically, this has required special equipment and considerable man-hours of labor sometimes even requiring the assistance of Military Construction Units (MILCON), requiring significant military financial resources to erect and disassemble such "non-permanent" structures.

In light of the above, it would be advantageous to provide a training environment which can utilize the Hyper-Realistic™ combat environment at any on-site location in a variety of complex, tactically challenging configurations. It would be further advantageous to provide a training environment where the structures are field-repairable allowing realistic visual feedback to trainees during live fire field exercise, while still allowing multiple training runs without the need to replace training structures.

It is an object of the present invention to provide a repairable construction set and method for assembling and disassembling an RHU in a variety of configurations, at a training site, with as few as two persons. Alternatively, it is an object of the present invention to provide a repairable non-permanent construction set having the ability of off-site assembly for air transport to facilitate training in remote locations or at high altitudes for specialized military training without the need for military construction units (MILCON). Still another object of the present invention is to provide a construction set that requires the use of only a single, hand operated tool for the assembly and disassembly of an entire RHU. Yet another object of the present invention is to provide a construction set for the assembly and disassembly of an entire RHU that is relatively simple to manufacture, is extremely simple to use, and is comparatively cost effective.

As is known in the art, transmittance is expressed as the fraction of electromagnetic radiation ("EM" radiation) at a specified wavelength that passes through a medium. EM radiation as referred to herein includes predominantly non-visible EM emissions, such as RF and radar pulses, as opposed to visible light. In contrast to transmittance, reflectivity is the quality of a material, expressed as a unitless coefficient, explaining the fraction of incident electromagnetic power that is reflected at an interface between the EM radiation and the material's surface. In addition, building materials may vary in their thermal conductivities.

As technology advances, a variety of new sensors are being used to penetrate structures to provide additional intelligence as to who, what, and what activities are within a building structure. Typically, sensors will rely on the interpretation of an electromagnetic signal passing through, reflecting off, or emanating from the structure. While the entire electromagnetic spectrum is theoretically available, certain ranges are currently use more than others. Beginning at the low frequency (long wavelength) end of the spectrum these may include: radio waves, microwaves, infrared, visible light. Sensors may be used to detect communications, equipment, and/or persons within a structure, reinforcements and/or vulnerable portions of a structure, etc. Further, sensor operators may recognize that different building material may have their own unique appearance when viewed in a sensor environment.

SUMMARY OF THE INVENTION

Aspects of the present disclosure generally pertain to a relocatable habitat unit (RHU) simulating a building structure made of a structural material, which can be assembled and disassembled on-site, using panels that can be maneuvered, positioned and interconnected by no more than two men. Aspects of the present disclosure more specifically are directed toward and RHU including at least one interchangeable panel having an outer wall and an electromagnetically interactive material that is freely reconfigurable.

A panel for simulating a building structure component made of a structural material is disclosed herein. The panel includes an outer wall made of a lightweight material, said lightweight material being defined as lighter-in-weight than the structural material, the outer wall having an outer side and an inner side, the outer side of the outer wall configured to visually simulate the building structure component made of the structural material; and an electromagnetic interaction simulator affixed to the outer wall, and coordinated to simulate at least one of a reflectivity, an absorption, and a transmittance of the building structure component made of the structural material, in at least one non-visible portion of the electromagnetic spectrum.

According to one embodiment, a relocatable habitat unit (RHU) simulating a building structure made of a structural material is disclosed herein. The RHU includes a first panel, a second panel, a third panel, and a fourth panel, each including a plurality of interlock connectors, and each connectable to at least one other via the interlock connectors. The fourth panel further includes an outer wall made of a lightweight material, said lightweight material being defined as lighter-in-weight than the structural material, the outer wall having an outer side and an inner side, the outer side of the outer wall configured to visually simulate a wall made of the structural material, and an electromagnetic interaction simulator affixed to the outer wall, and coordinated to simulate at least one of a reflectivity, an absorption, and a transmittance of the building structure component made of the structural material, in at least one non-visible portion of the electromagnetic spectrum.

According to another embodiment, a kit for a relocatable habitat unit (RHU) simulating a building structure made of a structural material is disclosed herein. The structural material includes at least one of wood, concrete, adobe, stone, brick, stucco, mortar, mud, bamboo, straw, thatch, cinder block, river rock, or any combination thereof The kit includes a first panel, a second panel, a third panel, and a fourth panel, each including a plurality of interlock connectors, and each connectable to at least one other via the interlock connectors. The fourth panel further includes an outer wall made of a lightweight material, said lightweight material being defined as lighter-in-weight than the structural material, the outer wall having an outer side and an inner side, the outer side of the outer wall configured to visually simulate a wall made of the structural material, and an inner wall pivotably affixed to the outer wall and forming a cavity therebetween.

The kit further includes a first electromagnetic interaction simulator and a second electromagnetic interaction simulator. The first electromagnetic interaction simulator includes a first electromagnetically interactive material that is positionable in the cavity between the inner wall and the outer wall of the fourth panel and is removably affixable to the outer wall, the first electromagnetic interaction simulator being coordinated to simulate at least one of reflectivity, absorption, and transmittance of the building structure component made of the structural material, in a first non-visible portion of the electromagnetic spectrum. The second electromagnetic interaction simulator includes a second electromagnetically interactive material that is positionable in the cavity between the inner wall and the outer wall of the fourth panel and is removably affixable to the outer wall, the second electromagnetic interaction simulator being coordinated to simulate at least one of reflectivity, absorption, and transmittance of the building structure component made of the structural material, in a second non-visible portion of the electromagnetic spectrum.

BRIEF DESCRIPTION OF THE DRAWINGS

The novel features of this disclosure, as well as the invention itself, both as to its structure and its operation, will be best understood from the accompanying drawings, taken in conjunction with the accompanying description, in which similar reference characters refer to similar parts, and in which.

DETAILED DESCRIPTION

Figure 1:
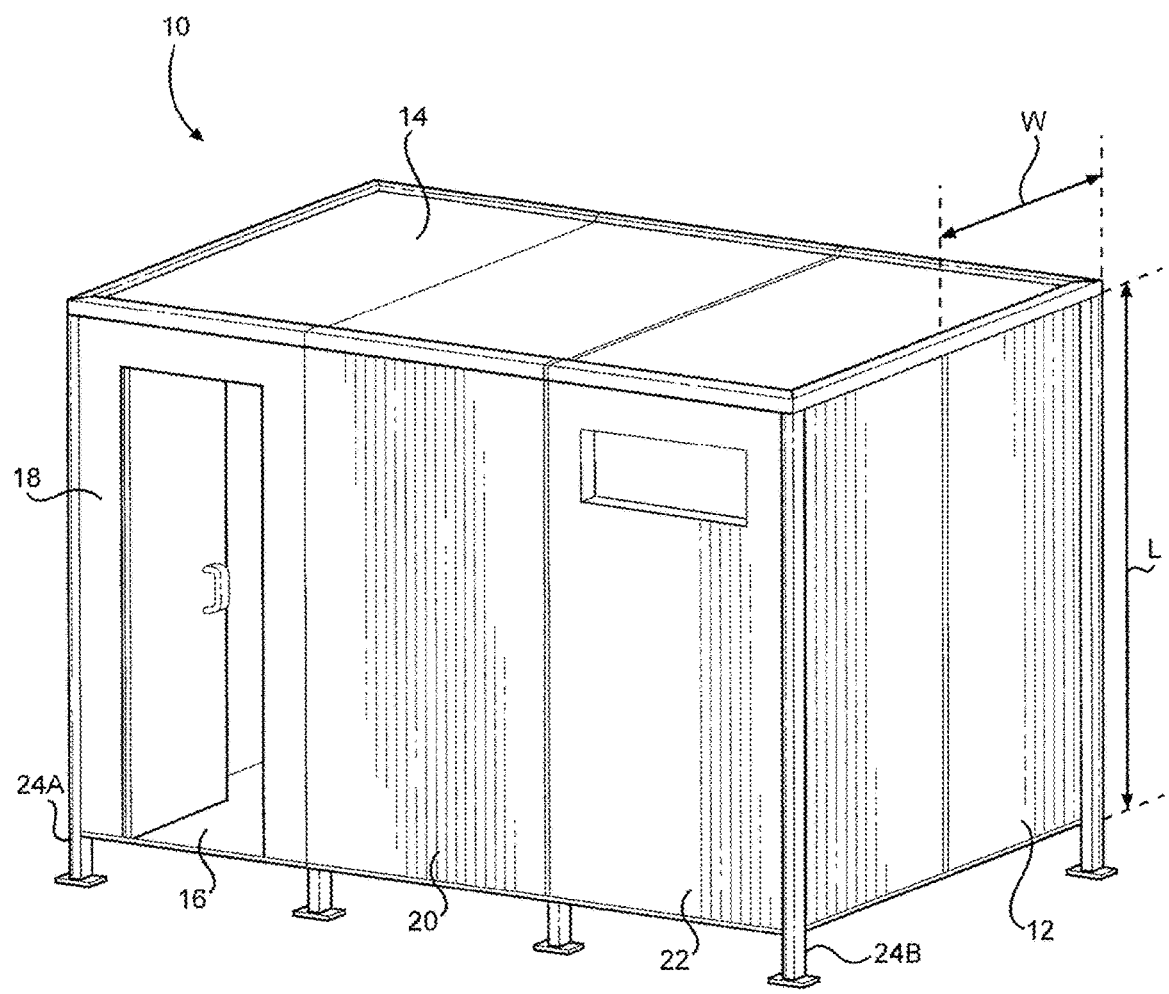
FIG. 1 is a perspective view of an assembled Relocatable Habitat Unit (RHU) in accordance with the present disclosure.

The Relocatable Habitat Unit (RHU) of the present disclosure is assembled using a plurality of substantially flat panels, designed to be modular, scalable, reconfigurable, and relocatable.

The RHU is based on a lightweight 4'.times.8' composite material panel system and engineered to assemble into multi-story, complex configurations with a single tool. The RHU panels are constructed with pultruded fiberglass reinforced plastic beams, bonded with wood, composite, or expanded polystyrene foam panels that are laser cut to replicate the look and texture of various building materials like brick, adobe, mud, wood, bamboo, straw, thatch, etc., sprayed with one-eighth inch of a fire retardant pro-bond and "sceniced" (Pronounced SEE-nicked; a movie industry term that means "aged" to look weathered). Materials and construction provide all-weather, long-lasting, fire-retardant structures suitable for year-round military training in all environments.

In a preferred embodiment, any interior or exterior panel can be interchanged. Common amenities such as windows, doors, stairs, etc. can be attached or installed to the RHU structure. Additionally, a variation of these modular panels can also be used to clad other structures, such as containers, wooden temporary structures, or permanent buildings. For this assembly operation, each panel includes male (M) and female (F) lock connectors. Specifically, these connectors are located along the periphery of each panel, and of each component that interfaces with the edge of a panel. Importantly, all of the (M) connectors can be engaged with a respective (F) connector using the same tool. Thus, an entire RHU can be assembled and disassembled in this manner. Further, each panel is sufficiently lightweight in order to be moved and positioned by one person. As a practical matter, a second person may be required to use the tool and activate the connectors as a panel is being held in place by the other person.

In detail, a construction set for use with the present disclosure includes a plurality of panels and only the one tool. Each panel has a periphery that is defined by a left side edge, a right side edge, a top edge, and a bottom edge. However, selected panels can have different configurations that include a door or a window. Still others may simply be a solid panel. In particular, solid panels are used for the floor and ceiling (roof) of the RHU. Furthermore, a panel can be omitted, leaving a void to facilitate an entry or exit to a higher or lower level when the RHU is utilized in the multi-story configuration. Each panel, regardless of its configuration, will include at least one (M) connector and at least one (F) connector that are located on its periphery.

In addition to the wall, floor, and ceiling panels, an embodiment of the construction set also includes corner connections and ceiling attachments. Specifically, corner connections are used to engage wall panels to each other at the corners of the RHU. The ceiling attachments, on the other hand, allow engagement of roof panels with the top edges of wall panels and can also be used to stack multiple levels of a RHU, creating complex multi-level urban structure designs. In the multi-level configuration, vertical corner posts and horizontal beams provide a similar function to the corner connections and ceiling attachments, and are used to construct a frame to support a plurality of panels completing an RHU.

The placement and location of male (M) and female (F) lock connectors on various panels of the construction set is important. Specifically, in one embodiment, along the right side edge of each wall panel, between its top edge and bottom edge, the lock configuration is (FMMF). Along its left side edge, the lock configuration is (MFFM). Further, along the top edge the lock configuration is (MM), and along the bottom edge it is (M) or (F), depending on the connector of the floor panel. Each lock sequence will have a complementary analogue on the interfacing surface allowing easy interchangeability of the panels.

Unlike the panels, the corner connections are elongated members with two surfaces that are oriented at a right angle to each other. The lock configurations for a corner connection are (F-F) along one surface and (-FF-) along the other surface. Like the corner connections, the ceiling attachments also present two surfaces that are at a right angle to each other. However, their purpose is different and, accordingly, they have a (FF) lock configuration on one surface for engagement with the top edge of a wall panel. They also have either a (MM) or a (FF) configuration along the other surface for connection with a ceiling panel.

Importantly, in addition to the above mentioned panels, connections, and attachments, the construction set of the present disclosure includes a single hand tool. Specifically, this hand tool is used for activating the various male (M) connectors for engagement with a female (F) connector, in addition to driving other required hardware. For the present disclosure, this tool preferably includes a hex head socket, a drive that holds the hex head socket, and a ratchet handle that is swivel-attached to the drive.

For assembly of the RHU, the first task is to establish a substantially flat floor. This is done by engaging male (M) connectors on a plurality of floor panels with female (F) connectors on other floor panels. The floor is then leveled using extensions that can be attached to the floor panels at each corner. Next, a wall is erected around the floor of the RHU by engaging a male (M) connector on the right side edge of a respective wall panel with a female (F) connector on the left side edge of an adjacent wall panel. Recall, the lock configurations on the left and right edges of wall panels are, respectively, (FMMF) and (MFFM). Additionally, the bottom edge of each panel in the wall is engaged to the floor using mutually compatible male (M) and female (F) connectors. Finally, the roof is created for the RHU by engaging male (M) connectors on ceiling panels with female (F) connectors on other ceiling panels. The ceiling attachments are then engaged to the assembled roof. In turn, the ceiling attachments are engaged to the top edge of a wall panel using mutually compatible male (M) and female (F) connectors. All connections for the assembly of the RHU are thus accomplished using the same tool.

In a preferred embodiment all panels are interchangeable. A frame is constructed consisting of vertical corner posts and horizontal beams (analogous to the corner connections and ceiling attachments), each formed with M and F lock connectors along their length that complement the lock connectors on the panels. Once the frame is in place, the panels may be configured and reconfigured as needed. Vertical corner posts and horizontal beams are also secured together using the single tool and additional hardware. By assembling a plurality of RHUs in this manner, the RHUs can be configured in any complex configuration that will best simulate the indigenous environment desired. A plurality of RHUs can be placed side-to-side, back-to-back, offset, stacked, or staggered to create a multi-level scalable structure. A simple repair kit provides quick easy patching of the composite materials.

Referring initially to FIG. 1, a Relocatable Habitat Unit (RHU) in accordance with the present disclosure is shown and is generally designated 10. As shown, the RHU 10 includes a plurality of individual panels, of which the generic panel 12 (sometimes hereinafter referred to as a wall panel) is 15 exemplary. The panel 12 is substantially flat, and is rectangular in shape with a width ("W") of approximately four feet and a length ("L") of approximately eight feet (i.e. the panel 12 is a 4.times.8). Alternatively, a panel 12 may be dimensioned as a 4.times.4. The depth of the panel 12 can vary slightly but, in general, will only be two or three inches. Preferably, the panel 12 is made of a light-weight composite polymer foam type material, such as expanded polystyrene foam panels having a density of approximately two pounds per cubic foot, with pultruded fiberglass reinforced plastic beams framing the foam core.

In an embodiment of the RHU 10 of the present disclosure there are essentially three types of panels 12. These are generally denoted by their structural function in the RHU 10 and are: a wall panel 12, a ceiling panel 14 and a floor panel 16. Further, the wall panels 12 may have any of three different configurations. Specifically, these configurations are shown in FIG. 1, and are: a door panel 18, a solid panel 20 and a window panel 22. Additional preferred embodiments with interchangeable wall, ceiling, and floors panels are detailed below.

Regardless of configuration, however, the exterior of each wall panel 12 can be dressed to appropriately simulate the desired indigenous environment. In order to replicate diverse geographic conflict zones and facilitate the Hyper-Realistic™ combat training experience, the panels 12 can be laser etched providing the ability to replicate the look and texture of various building materials including brick, cinder block, adobe, mud, wood, bamboo, straw, thatch, river rock, or other required looks. FIG. 1 also shows that the RHU 10 is supported by a plurality of adjustable extensions, of which the extensions 24*a* and 24*b* are exemplary.

Figure 2:
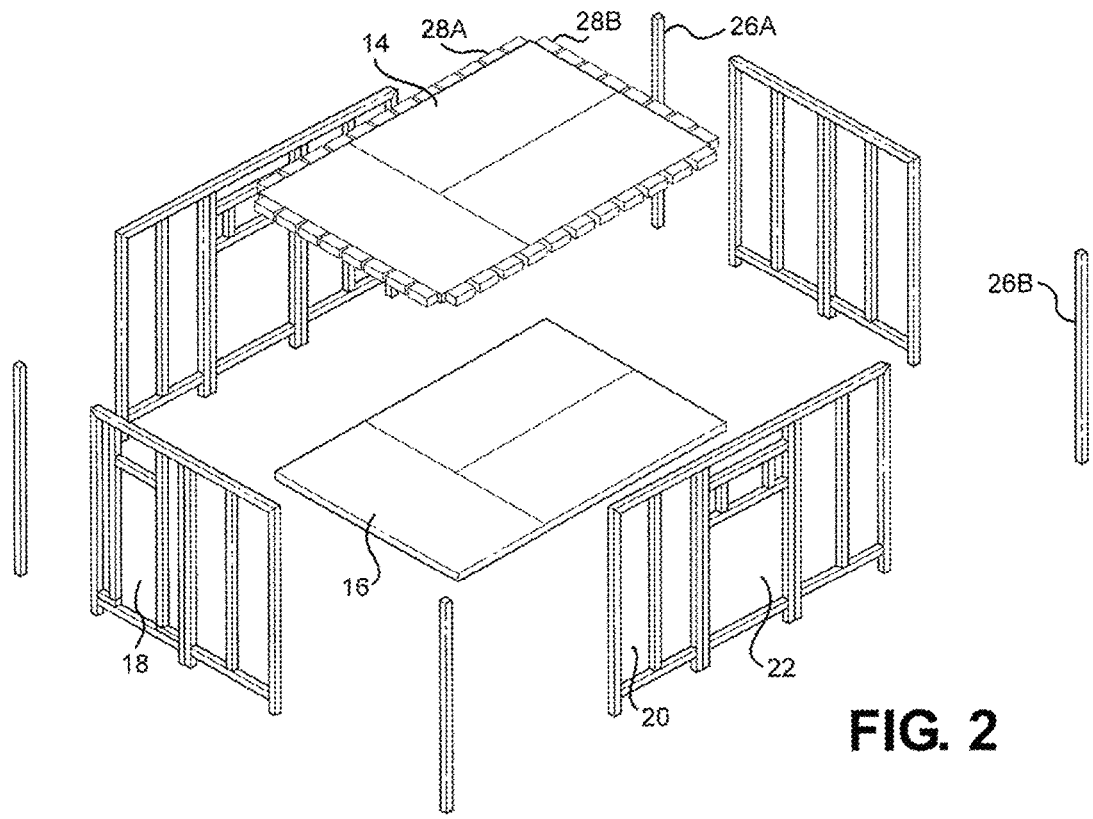
FIG. 2 is an exploded perspective view of an RHU.

FIG. 2 shows that, in addition to the panels 12, the RHU 10 includes a plurality of corner connections 26, of which the corner connections 26*a* and 26*b* are exemplary. Further, FIG. 2 shows there is a plurality of ceiling attachments 28, of which the ceiling attachments 28*a* and 28*b* are exemplary. As will be more fully appreciated with further disclosure, these corner connections 26 and ceiling attachments 28 are used to interconnect panels 12.

Figure 3:
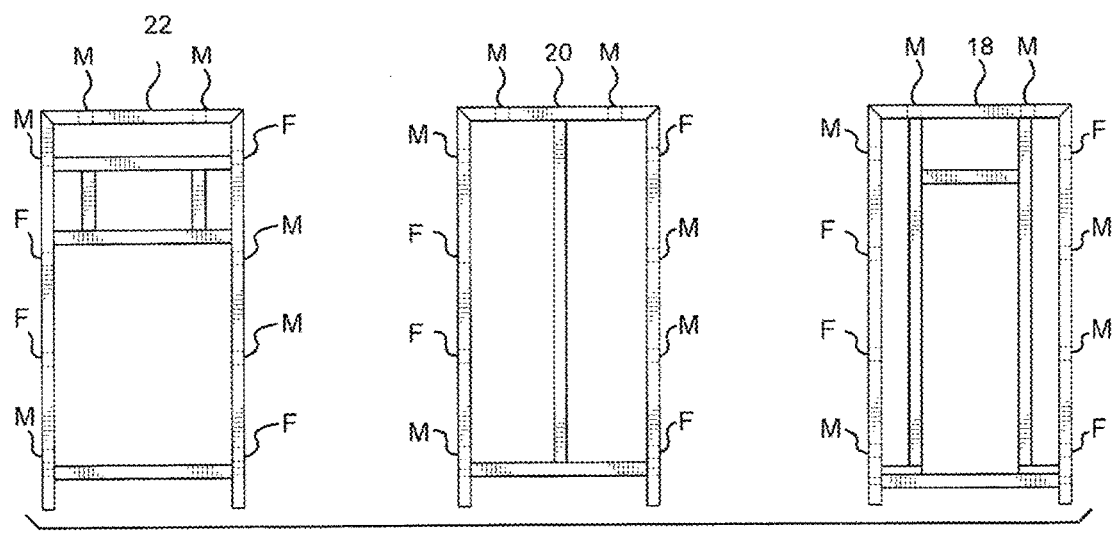
FIG. 3 is an elevation view of three panels for an RHU shown positioned for connection of their respective male (M) and female (F) connectors.

It is an important aspect of the present disclosure that the panels 12, the corner connections 26 and the ceiling attachments 28 have compatible male 10 (M) and female (F) locking connectors. For example, FIG. 3 shows a door panel 18, a solid panel 20 and a window panel 22 placed in side-by-side relationship with their respective M and F locking connectors positioned for engagement. Details of the structure involved will, perhaps, be best appreciated by cross referencing FIG. 3 with FIG. 4.

Figure 4:
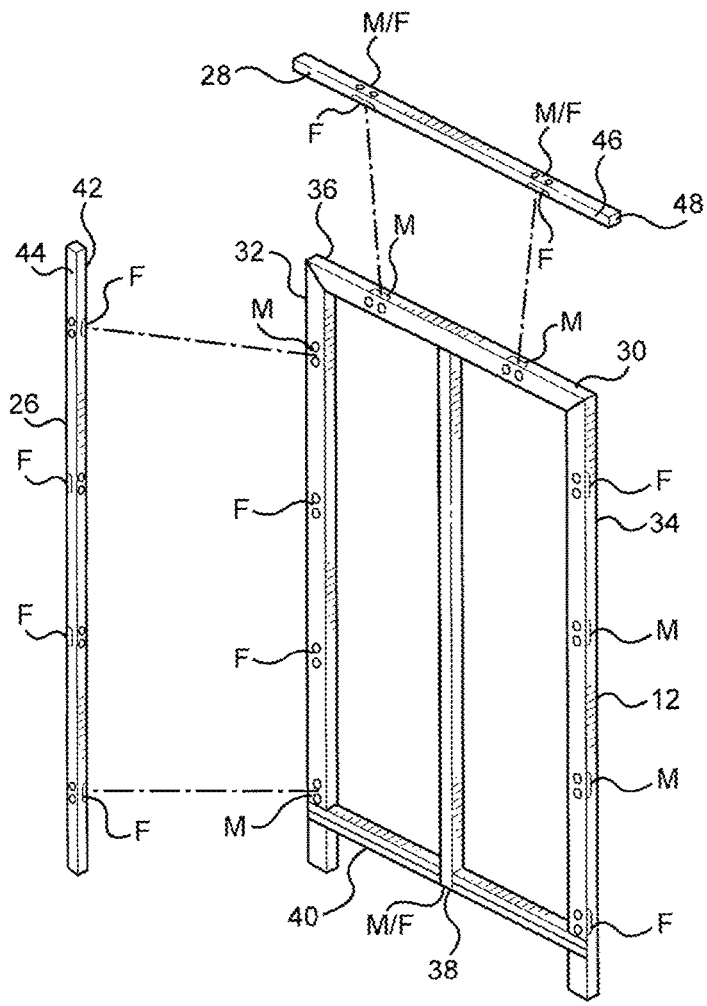
FIG. 4 is a perspective view of a single wall panel of an RHU positioned for engagement with a corner section and a ceiling attachment.

In FIG. 4 a panel 12 is shown to have a substantially rectangular periphery 30 that is defined by a left side edge 32, a right side edge 34, a top edge 36 and a bottom edge 38. Further, FIG. 4 shows that the panel 12 includes a ledge 40 that extends along the bottom edge 38 and outwardly from the periphery 30. The purpose of ledge 40 is to rest on a floor panel 16 of an assembled RHU 10 (i.e. when a wall panel 12 has been engaged with the floor panel 16), to thereby provide additional support for the panel 12.

FIG. 4 also shows that a corner connection 26 is an elongated member having a first surface 42 and a second surface 44. For purposes of the present disclosure, the first surface 42 needs to be oriented at a right angle (i.e. orthogonal) to the second surface 44. Importantly, the first surface 42 is provided with F locking components that are aligned as (F-F). Thus, the first surface 42 of corner connection 26 is compatible with the alignment (MFFM) shown for locking connectors on the left side edge 32 of the panel 12. Stated differently, the top and bottom M lock connectors on the left edge 32 of panel 12 will lock, respectively, with the top and bottom F lock connectors on first surface 42 of corner connection 26. Note also that the alignment of locking connectors on the second surface 44 of corner connection 26 is (-FF-). This is likewise compatible with the alignment (FMMF) that is typical for the right side edge 34 of a panel 12 (see also FIG. 3).

Like the corner connections 26, the ceiling attachments 28 are elongated members. Also, the ceiling attachments 28 have a first surface 46 and a second surface 48. Like the corner connections 26, the first surface 46 of the ceiling attachment 28 needs to be oriented at a right angle (i.e. orthogonal) to its second surface 48. As shown in FIG. 4, the second surface 48 of the ceiling attachment 28 includes a pair of F locking connectors that will interact with respective M locking connectors along the top edge 36 of the panel 12. On the other hand, the first surface 46 may have either M or F locking connectors for engagement with a ceiling panel 14.

Figure 5:
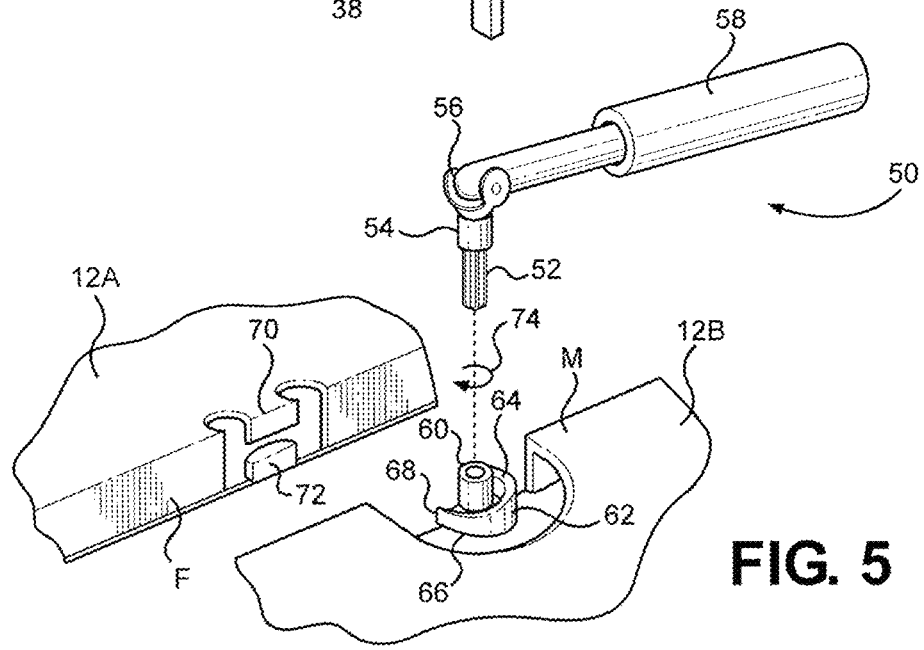
FIG. 5 is a perspective view of portions of two panels from an RHU, with portions broken away to show the interaction of male (M) and female (F) connectors in their operational relationship with a tool that is used to assemble the RHU in accordance with the present disclosure.

The interaction of M and F locking connectors will be best appreciated with reference to FIG. 5. There it will be seen that the present disclosure employs a tool, generally designated 50. As shown, the tool 50 includes a hex head 52 that is connected to a drive 54. It will be appreciated by the skilled artisan that the hex head 52 shown in FIG. 5, however, is only exemplary of head configurations that may be used for the present disclosure. In any event, the drive 54 is connected to a swivel ratchet 56 that, in turn, is connected to a handle 58. As envisioned for the present disclosure, this tool 50 is all that is required to assemble the RHU 10.

Still referring to FIG. 5, it will be seen that the panel portions 12*a* and 12*b* have respective F and M locking connectors. As envisioned for the present disclosure, all M and F locking connectors used for the RHU 10 of the present disclosure are substantially identical. In detail, the M locking connector is shown to include a hex socket 60 with an attached cam lock 62. Further, the cam lock 62 is shown to have an upper ramp 64 and a lower ramp 66 that are inclined so there is an increasing taper extending from end 68 back to the hex socket 60. In contrast, the F locking connector on panel 12*a* is shown to include an upper abutment 70 and a lower abutment 72.

For an engagement between an M and an F locking connector, the connectors need to first be juxtaposed with each other. This can be accomplished in any of several ways. For instance, either side edges 32/34 of panels 12 are juxtaposed to each other (e.g. see FIG. 3); ceiling panels 14 and floor panels 16 are respectively juxtaposed (see FIG. 2); a corner connection 26 is juxtaposed with a side edge 32/34 of a panel 12 (e.g. see 5 FIG. 4); a ceiling attachment 28 is juxtaposed with the top edge 36 of a panel 12 or with a ceiling panel 14; or the bottom edge 38 of a panel 12 is juxtaposed with a floor panel 16. In each case, it is important that an M locking connector be positioned opposite an F locking connector.

Once an M and an F locking connector have been properly positioned with each other, as indicated above, the hex head 52 of tool 50 is inserted into the hex socket 60. The tool 50 is then turned in the direction of arrow 74. This causes the ramps 64/66 of cam lock 62 to respectively go behind the abutments 70/72. The M and F locking connectors are then engaged.

In accordance with the present disclosure, assembly of this embodiment of the RHU 10 is best accomplished by following a predetermined sequence of steps. First, a plurality of floor panels 16 is engaged together to form a floor for the RHU 10. The floor is then positioned and leveled by adjusting the extensions 24 that are provided for that purpose. Next, starting at a corner for the RHU 10, a corner connection 26 is engaged with panels 12. Note: at this point the respective ledges 40 on panels 12 are positioned to rest on the adjacent floor panel 16. Also, the bottom edges 38 of the wall panels 12 are engaged through M/F locking connections to the adjacent floor panel 16. This continues until all walls of the RHU 10 have been erected. As intended for the present disclosure, door panels 18, solid panels 20 and window panels 22 can 25 be used as desired in the assembly of the walls for the RHU 10.

After the walls of RHU 10 have been erected, the roof is created. Specifically, ceiling attachments 28 are engaged, as required, with a single ceiling panel 14 (see FIG. 2). This ceiling panel 14, with its ceiling attachments 28, is positioned so the ceiling attachments 28 can be 30 connected, via M/F locking connectors, to the top edges 36 of respective panels 12. Additional ceiling panels 14 and their associated ceiling attachments 28 can then be similarly created, positioned and connected to other ceiling panels 14 and other wall panels 12, to complete the roof. The RHU 10 is thus assembled, and appropriate set dressing can then be added.

Importantly, all of the tasks described above for the assembly of an RHU 10 are accomplished using only the tool 50. Axiomatically, it follows that this embodiment of the entire RHU 10 is held together with only a plurality of M/F locking connections.

Figure 6:
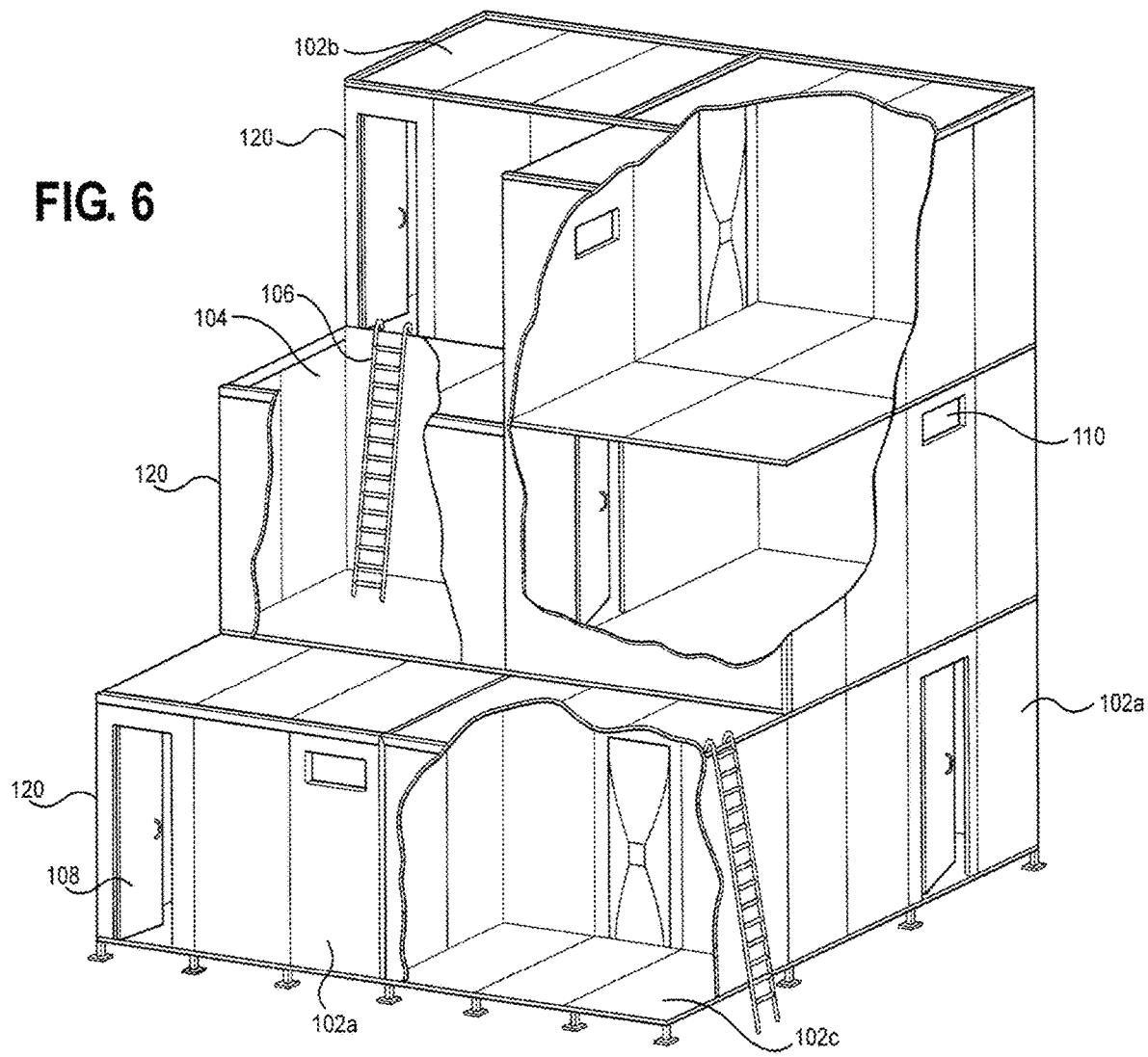
FIG. 6 is a front perspective cut away view of a multi-level RHU having doors and windows formed several of the panels and certain panels omitted leaving a void, allowing access between levels.

Referring now to FIG. 6, a preferred embodiment of the present disclosure is shown configured in a multi-level arrangement, generally designated 100. Due to the wide array of options, a multi-level RHU 100 has a nearly infinite array of floor plans, completed by using the wide array of building options for multi-level construction or by abutting multiple single-level RHUs 120. RHU 120 is described in further detail with regard to FIG. 7. In order to facilitate construction of RHU 100, an interchangeable panel 102 is incorporated for use as a floor, ceiling, or wall panel. For purposes of this description, panels will be annotated with a letter a, b, or c to denote their use as a wall, ceiling, or floor panel 102. Accordingly, the multi-level RHU 100 of FIG. 6 shows three single-level RHUs 120 formed by joining multiple wall panels 102*a*, ceiling panels 102*b*, and floor panels 102*c*. Nearly any practical single or multi-story floor plan and can be achieved, taking into account the load bearing capabilities of the various members and the need for additional support on the lower floors, as the structure grows beyond the design yield of the various components. As such, the three exemplary stories should not be considered limiting to one skilled in the art.

As shown in FIG. 6, using a plurality of single story base RHUs 120, a multi-story RHU 100 with hundreds of panels is easily assembled. Multi-story RHU 100 has three scalable levels with multiple entry and exit points. Similar to previous embodiments, each of the panels 102 can be formed with a door 108 or a window 110. The size and location of doors 108 and windows 110 may vary based upon design and need. An alternative embodiment of a single level RHU 120 can further be reconfigured to have two or more wall panels 102*a* absent or removed from the construction and outfitted with roll up doors (not shown in this Figure), similar to a garage door, further facilitating a Hyper-Realistic™ training environment. Each panel 102 is intended to be fully reconfigurable, allowing the replacement of a wall panel 102*a* with a different wall panel 102*a* that is formed with a door 108 or window 110, or other amenity without disassembling any other part of the RHU 100. The same is true for each floor panel 102*c* and ceiling panel 102*b*. Each panel 102 is designed to be "plug-and-play."

Each single-level RHU 120 is based on an exemplary four foot by eight foot composite material panel 102 system (described in greater detail below) that is lightweight and engineered to assemble into multi-story, complex configurations with only the tool 50.

In order to replicate diverse geographic conflict zones and facilitate the Hyper-Realistic™ combat training experience, the panels 102 can be laser etched and colored appropriately providing the ability to replicate the look and texture of various building materials including brick, cinder block, adobe, mud, wood, bamboo, straw, thatch, or other required looks.

Because the RHU 100 of the present disclosure is utilized for military training sometimes involving high explosive, incendiary, or live ammunition, a commercially available fire retardant may be applied to each panel. In an embodiment, a ⅛ inch fire retardant hard coat is sprayed on each panel 102 mitigating the risk of conflagration while still providing the Hyper-Realistic™ training experience. With such an addition, the RHU 100 (and RHU 120) is Class 1 (Class A) Fire Rated.

In another preferred embodiment, following application of the fire retardant, a commercially available liquid stucco product can be applied before a panel 102 is "sceniced" (pronounced: see-NICKED) which is a common method in the movie industry to create an "aged" weathered look and is well known among those with ordinary skill in the art of stage production and design. The design and configuration of the RHU of the present disclosure are based on knowledge of military tactic techniques and procedures, security and stability operation, Basic Urban Skills Training ("BUST"), and Close Quarters Battle ("CQB") principles to replicate structures environment, and signage from virtually any geographic region of the world including but not limited to Iraq, Afghanistan, Southeast Asia, and Africa.

While this method of utilizing tactical military knowledge combined with movie industry techniques for creating a realistic look (HyperRealistic™) for the RHU 100 of the present disclosure is currently employed, other methods of design, configuration, and aging such a structure for alternative purposes may be used without departing from the scope and spirit of the present disclosure and have been fully contemplated herein.

To facilitate movement from one level of the multi-story RHU 100 to the next level, a ceiling panel 102b is left unassembled creating a ceiling void 104. Void 104 can be used in conjunction with a ladder 106 or staircase (not shown) to facilitate the movement between vertical levels. Alternatively, a specialized panel 102 with a stairwell opening can be implemented and used either with a ladder or with a separate staircase attachment (not shown). Virtually any desired design can be created by using additional components for larger multilevel RHUs 100.

Figure 7:
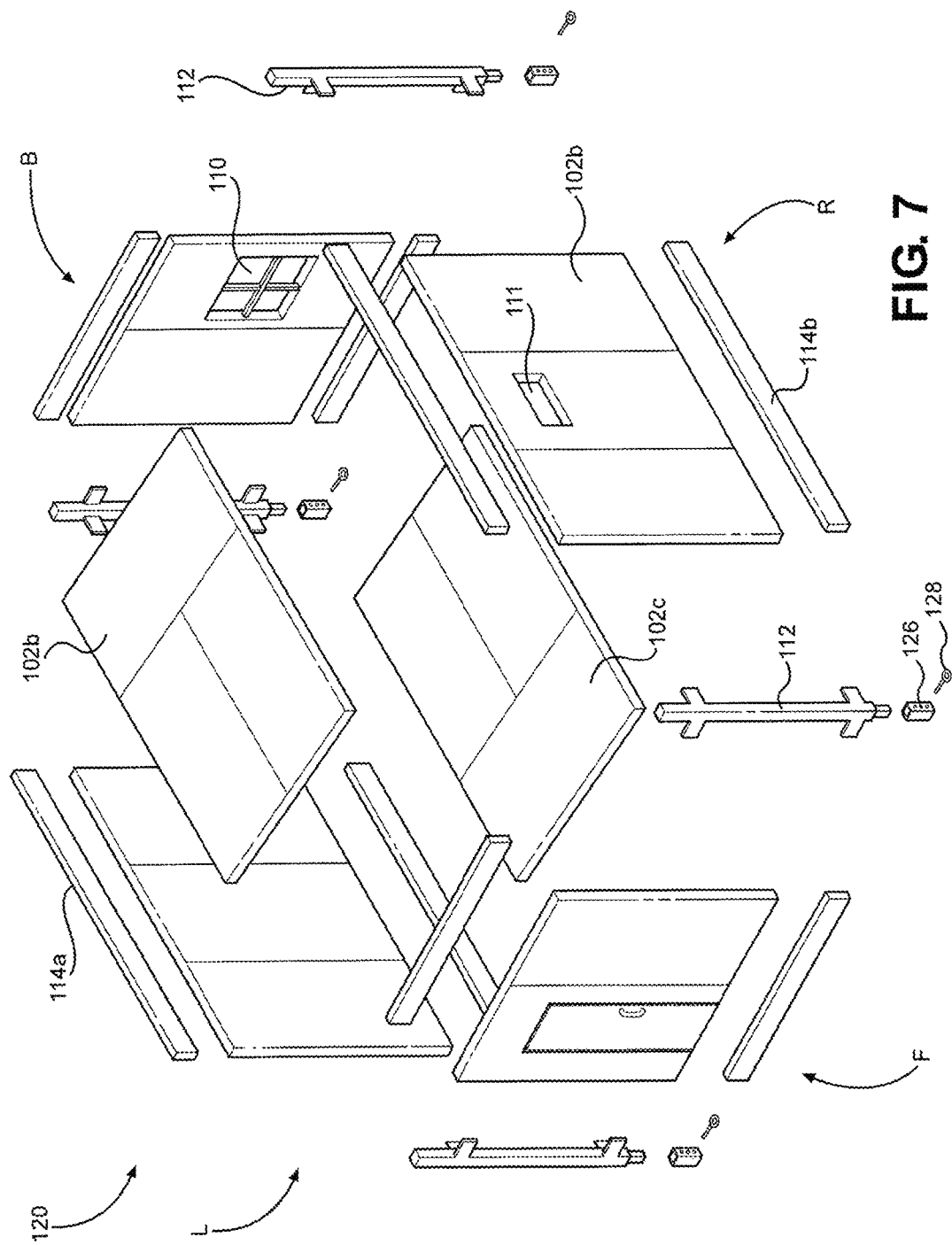
FIG. 7 is an exploded view of a single level relocatable habitat unit showing the interaction of the various interchangeable panels, the vertical corner posts and horizontal beams that create a frame providing a versatile simulated building.

Referring now to FIG. 7, an exploded view of a single level RHU 120 is shown with all of the associated parts. As depicted, 16 interchangeable panels 102 are shown: 10 wall panels 102a, three ceiling panels 102b, and three floor panels 102c. This construction is similar to the RHU of FIG. 1; however all of the panels 102 are fully interchangeable. Further shown in this Figure are four vertical corner posts 112 joining the four walls of RHU 120. Four horizontal beams 114 are shown joining the three ceiling panels 102b (forming the ceiling) to the four walls. Four more horizontal beams 114 are further shown connecting the three floor panels 102c (forming the floor of RHU 120) to the four walls. Just as the panels 102 are interchangeable, the horizontal beams 114 are interchangeable and utilized to connect either the ceiling or the floor to a given wall.

The front of RHU 120, generally designated with the letter "F," is formed with two wall panels 102a, one of which is formed with a door 108. The back of RHU 120, generally designated with the letter "B," is also formed with two wall panels 102a, one of which is formed with a window 110. Each of the left and right walls, generally designated with the letters "L" and "R," respectively, is formed of three wall panels 102a. Additionally, the center wall panel 102a of the right wall R is further formed with a small window 111. The left wall L, is formed with three solid wall panels 102a, any of which could just as easily be removed for use as a ceiling panel 102b or a floor panel 102c.

Similar to the panels 18, 20, and 22 of FIG. 3, each panel 102 is capable of connection to an adjacent panel 102, using a plurality of male lock connectors ("M lock") 122 and female lock connectors ("F lock") 124 disposed along the periphery of panels 102 (shown in FIGS. 3 and 8), and arranged to accept the complementary M locks 122 and F locks 124 of an adjacent panel 102. Accordingly, each connecting surface of panels 102, vertical corner posts 112, and horizontal beams 114 are each formed with at least one M lock 122 and F lock 124, simplifying the connection of the various components of RHU 120. In most cases there is a plurality of each M locks 122 and F locks 124 on the connecting surfaces of each part of the construction set. The arrangement of M locks 122 and F locks 124 are complementary on each adjacent surface, facilitating interchangeability of parts.

M locks 122 and F locks 124 are notionally rotary locking cam locks 62 as explained above, requiring only the single tool 50 for the assembly and disassembly of an RHU 100 or 120. It is to be appreciated by those skilled in the art that other connectors may be used without departing from the scope and spirit of the disclosure.

Also shown in FIG. 7 are four vertical corner posts 112, each formed with complementary M locks 122 and F locks 124 (not shown), spaced and arranged to accept the complementary M lock 122 and F lock 124 (not shown) of adjoining wall panels 102a. As explained above, the vertical corner posts 112 will typically have two adjacent and orthogonal faces formed with the M locks 122 and F locks 124 to facilitate construction of a corner. However, in an embodiment, a vertical corner post 112 can have three or even all four sides formed with the required lock connectors 122 and 124 depending on the design requirements. The tool 50 is used to actuate the M lock 122 to engage with the F lock 124 and secure the vertical corner post 112 with adjacent wall panels 102a. Vertical corner posts 112 have a similar distribution of lock connectors 122 and 124 and are further described with reference to FIG. 9.

Eight horizontal beams 114 are also shown, joining the three connected floor panels 102c, and the three joined ceiling panels 102b, to each of the front wall F, back wall B, left wall L, and right wall R. Horizontal beams 114 are completely interchangeable and can be used either as ceiling connectors 114a or floor connectors 114b. While ceiling connectors 114a and floor connectors 114b are structurally identical, the "a" and "b" designations are added to differentiate their implementation. Horizontal beams 114 are further described with reference to FIG. 10. In an embodiment, horizontal beams 114a and horizontal beams 114b can be formed with slight design variations to accommodate different load conditions on the ceiling and floors.

Adjustable feet 126 are further shown attached to the vertical corner posts 112. RHU 100 and RHU 120 are generally constructed on flat terrain, however it is not generally practical to expect every tactical training environment to be perfectly flat. The addition of adjustable feet 126 to the base of RHU 120 allow the structure to accommodate small irregularities in the terrain upon which it is constructed. In an embodiment, adjustable feet 126 are formed with internal dimensions sized to receive the bottom of vertical corner post 112. Both the body of adjustable feet 126 and the bottom of vertical corner post 112 are formed with a plurality of holes through which a pin 128 or other hardware may be inserted to appropriately adjust the height of adjustable feet 126. In an alternative embodiment, adjustable feet 126 can be mounted to other locations along the base of an RHU 100 or 120 requiring additional support.

In an embodiment, additional adjustable foot assemblies (not shown) may be required for support of the floor along longer constructions or in designs requiring large floor plans.

Once RHU 120 is constructed, the panels 102 forming the RHU 120 can individually be removed and replaced, for instance, in order to repair a damaged ceiling panel 102b or add a replace a solid wall panel 102a with a wall panel 102a having a door 108, simply by releasing or engaging the associated M locks 122 and F locks 124 around the individual panel's 102 periphery.

It should be further noted by one skilled in the art that as depicted, ceiling panels 102b are configured as the ceiling of RHU 120. However, in a multi-level RHU 100, the same ceiling panel 102b can also become a floor panel 102b on an upper level.

Figure 8:
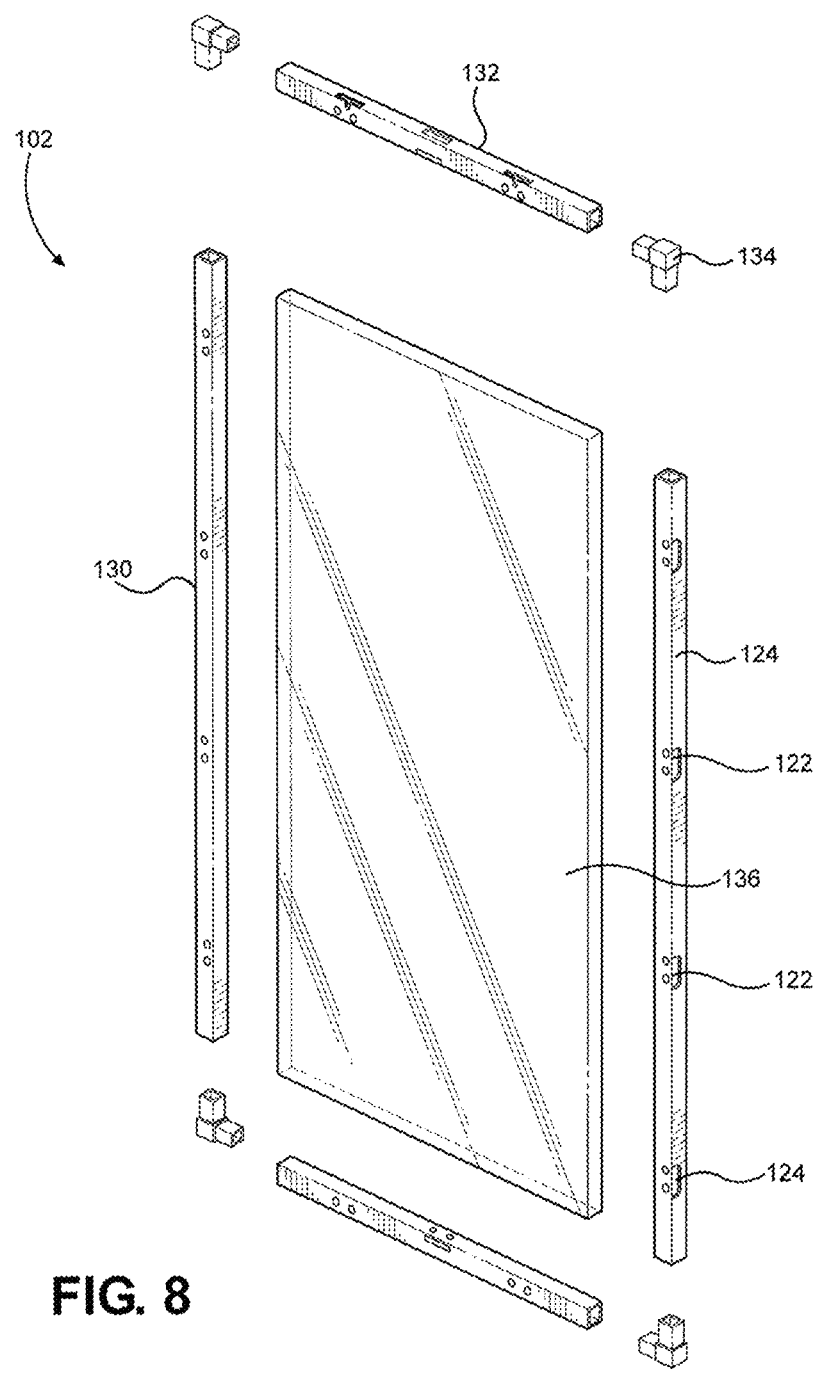
FIG. 8 is an exploded view of the internal structure of an exemplary interchangeable panel of the present disclosure, showing the interaction of the outer frame parts and inner material.

Referring now to FIG. 8, an exploded view of the internal structure of an exemplary interchangeable panel 102 is shown. Panel 102 as shown is formed with two long beams 130 and two short beams 132, each connected at the corners with corner fittings 134. These eight parts together to form the frame of panel 102. An inner material 136 fills the space between on the interior of the beams 130 and 132. Notionally, inner material 136 is foam, such as expanded polystyrene ("EPS") foam with a weight approximately two pounds per cubic foot. The entire panel 102 is then coated in EPS (not shown), providing an easily sceniced surface, allowing each panel to be customized to suit a particular tactical environment.

The dimensions of panel 102 are generally four feet by eight feet; however the dimensions should not be considered limiting. Such a dimension is common practice, and different sized panels 102 are fully contemplated.

In a preferred embodiment, panel 102 is constructed with beams 130 and 132 formed of pultruded fiberglass reinforced plastic, embedded in an EPS foam type material that serves to further decrease overall weight, compared to a metal construction. In an embodiment, additional composite members (not shown) may be incorporated into the design and composition of the inner material 136 to further increase the load bearing capacity of panels 102. In an alternative embodiment, aluminum or steel components may also incorporated into load bearing members. As such, the corners of the load bearing members may be welded together as is known in the art.

In an alternative preferred embodiment, the inner material 136 is wood or composite impregnated fiber material such as fiberglass. These materials serve to increase the panel's 120 load bearing capability, and are in keeping with the lightweight design of panel 102.

The selection of materials for the construction of panels 102 should not be considered limiting to those skilled in the art, as the essential aspect is a high strength-to-weight ratio. Other suitable materials are fully contemplated. Each panel is intended to be approximately 100 pounds but the ultimate weight can vary with construction materials and structure.

In a preferred embodiment, all three panels, 102a, 102b, and 102c, are identically fabricated and any panel can be used in any position wall, ceiling, or floor, performing one of the three structural functions in the RHU 120. In an alternative embodiment, given real world loads, a floor panel 102c or ceiling panel 102b may include an inner material 136 stronger than EPS by itself. In an alternative embodiment, the beams 130 and 132 can be formed of a metal or metal alloy, creating a stronger frame with an inner material 136 strong enough for application as a load bearing floor panel 102c or ceiling panel 102b.

In a preferred embodiment, when the panels 102 of RHU 100 or 120 are disassembled, panels 102 are stackable and can be palletized in a manner perfectly suited for transport by truck, rail, sea, and air. This is a particularly attractive feature as the RHU 100 of RHU 120 of the present disclosure is easily deployed to hard-to-reach and remote locations accessible only by a four-wheel drive truck or by helicopter.

Further design of the panels 102 have also taken into account the different load stresses encountered in various environments. While the flame retardant and visual characteristics have been explained above, internally, the panels 102 are strong enough to counter the vertical loading of wall panels 102a and sheer stresses on ceiling panels 102b and floor panels 102c such as a person or items on the roof of an RHU 120, to the sheer stresses from wind or seismic activity acting on the side of a completed RHU 120 or RHU 100.

An embodiment of the present disclosure further incorporates guy wires utilizing anchors (not shown) driven into the ground or adjacent structures connected to a high point on the RHU 100 or 120, supplementing the sheer strength of the panels and overall construction of the structure.

Figure 9:
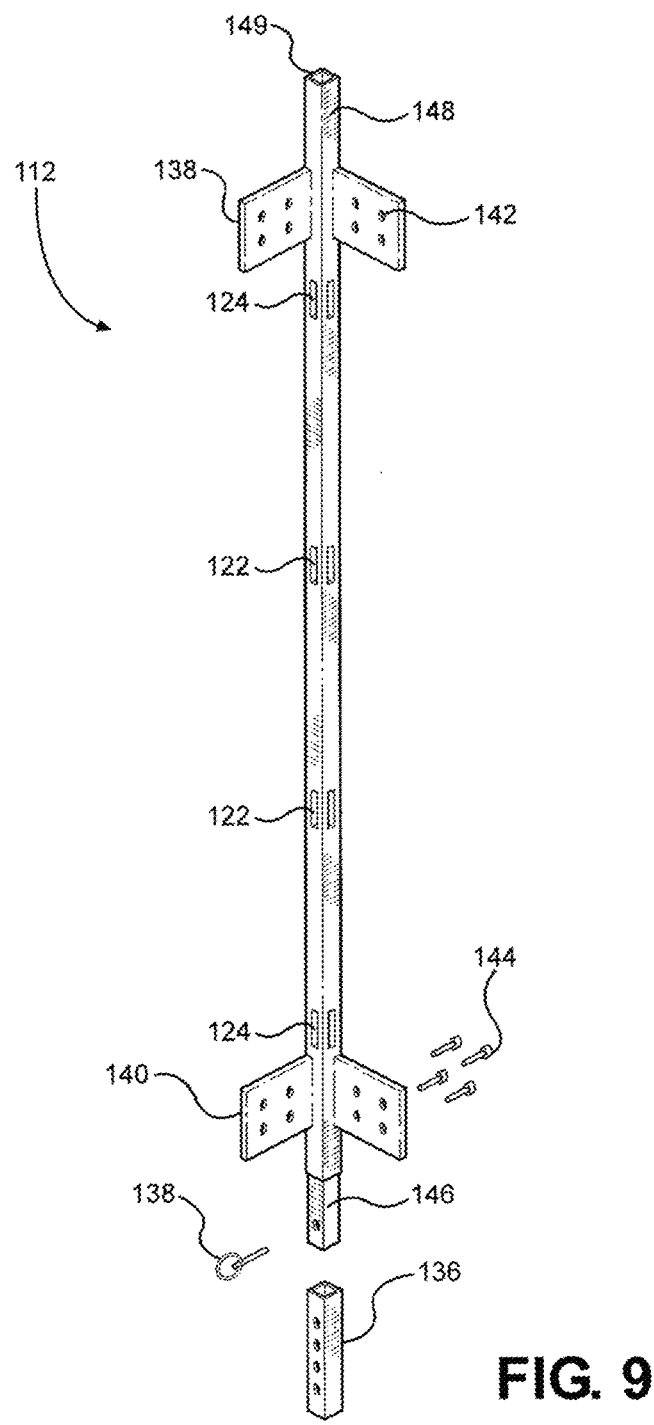
FIG. 9 is a perspective view of a vertical corner post, showing the placement of the flanges for securing horizontal beams, and arrangement of the M locks and F locks along the length of the vertical corner post.

Referring now to FIG. 9, a perspective view of an exemplary vertical corner post 112 is shown. In a preferred embodiment, the vertical corner posts 112 have M locks 122 and F locks 124 spaced along their length in order to accept complementary arrangements on the periphery of panels 102.

Vertical corner posts 112 are notionally formed of steel posts or similar high-strength materials, required due to the high loads encountered, especially when constructing a multi-level RHU 100. Vertical corner posts 112 are formed with flanges 138 and 140 and holes 142 sized to accept hardware 144 to secure horizontal beams 114. Hardware 144 is intended to require the same tool 50 required to actuate the M locks 122 and F locks 124. Using hardware 144, flanges 138 connect to horizontal beams 114a on the ceiling while flanges 140 connect to the horizontal beams 114b on the floor. Together, each creates a frame structure to which panels 102 are subsequently connected.

As shown, adjustable feet 136 are shown disconnected from the vertical corner post 112, with pin 138 extracted. The base 146 of the vertical corner post 112 has dimensions slightly smaller than the adjustable feet 136 as discussed above, allowing vertical movement with the pin 138 extracted. When the desired height of adjustable feet 136 is determined, the holes formed in both the base 146 and vertical corner posts 112 align, allowing insertion of the pin 138 at the desired adjustable foot 136 height.

In an alternative embodiment, vertical corner posts 112 and horizontal beams 114 can be formed in different lengths for different operational or build requirements. In an embodiment, a vertical corner post 112 can be formed more than one story in order to accommodate two floors (shown in FIG. 11). In an alternative preferred embodiment, the top 148 of vertical corner post 112 is formed with a central lumen 149 sized to accept the base 146 of another vertical corner post 112. In such an embodiment, additional pins 138 or other hardware (not shown) can be incorporated to further secure the base 146 of one vertical corner post 112 to the top 148 of the other.

Figure 10:
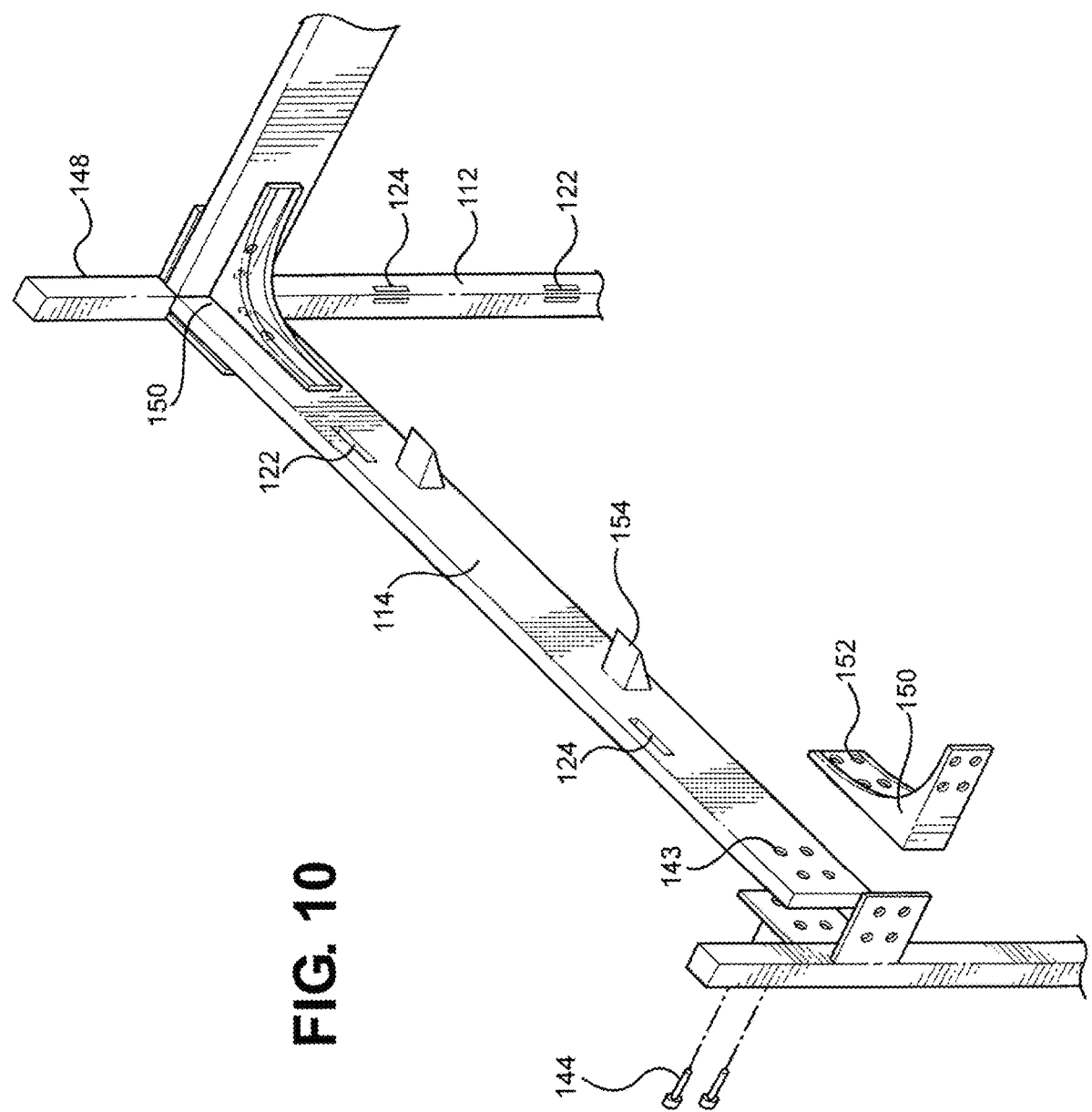
FIG. 10 is a perspective view of two vertical corner posts and their interaction with a horizontal beam, showing the connection points and associated hardware, M locks and F locks formed along the length of the posts and beam for connecting at least one wall panel and at least one ceiling panel, in addition to providing structural support for an upper level.

Referring to FIG. 10, a perspective view of an exemplary horizontal beam 114, as it would be secured to vertical corner posts 112, is shown. In an embodiment, horizontal beams 114 are aluminum beams. Horizontal beams 114 can also be formed of steel however aluminum is generally employed because it is lighter than steel and used in larger components such as horizontal beams 114. It is to be appreciated by those skilled in the art that the material utilized for these components should not be considered limiting. Any suitable material such as aluminum, steel, various alloys, or even composites may be employed to form vertical corner posts 112 and horizontal beams 114.

Horizontal beam 114 is formed with holes 143 to accept the hardware 144. In a preferred embodiment, holes 143 can be internally threaded to match the complementary external threads on hardware 144. In another preferred embodiment, a corner bracket 150 is incorporated on the interior of the horizontal beams 114 providing increased structural support. In an embodiment, the corner brackets 150 have holes 152 that may further be internally threaded to accept the external threads of the hardware 144 in use. The internal threading of either or both holes 143 within horizontal beam 114 or the holes 152 in the corner bracket 150 is not to be considered limiting. Further hardware such as cage nuts or other securing apparatus may be implemented or otherwise formed to the interior of corner bracket 150. However in order to maintain simplicity of the system, it is desirable that a preferred embodiment of the present disclosure use hardware 144 such as a bolt capable of being driven by tool 50 to secure all of the RHU 100 hardware.

In another preferred embodiment, the horizontal beams 114 are formed with tabs 154 that provide support to the beams 130 and 132 of panels 102 in use as ceiling panels 102*b* or floor panels 102*c*. When utilized as a floor panel 102*c* or ceiling panel 102*b*, the beams 130 and 132 of panel 102 rest upon and are supported by tabs 154 and optionally, within corner brackets 150. M locks 122 and F locks 124 are also spaced along the periphery of horizontal beams 114 and secure to the complementary M locks 122 and F locks 124 of panels 102 in use.

In an embodiment, the horizontal beams 114 can be formed in any practical length, accommodating one, two, or more panels 102. Accordingly, with four by eight foot panels 102 in use, horizontal beams 114 will notionally be formed in sections of multiples of four feet, and long enough to accommodate the number of required panels.

Figure 11:
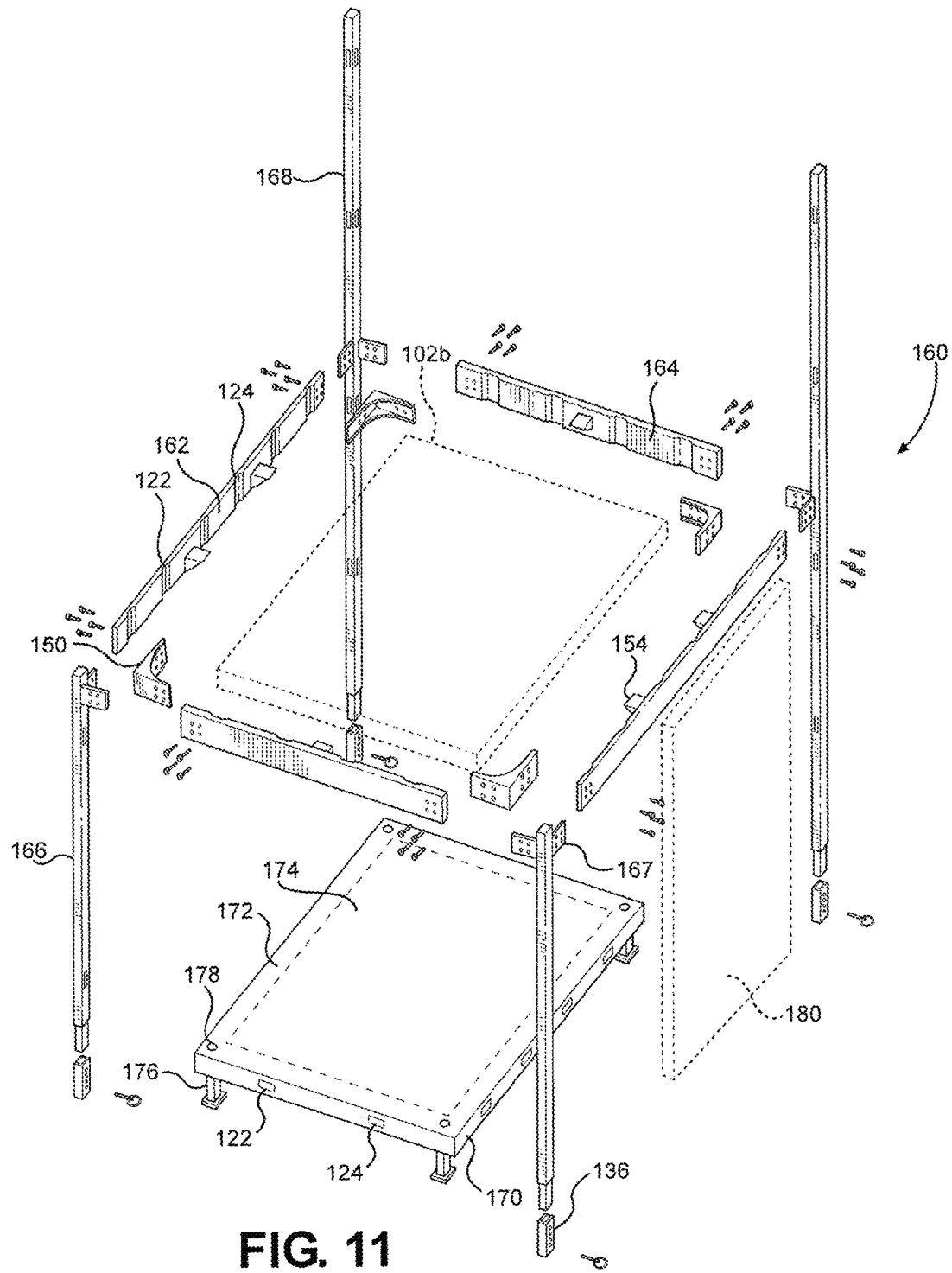
FIG. 11 is an exploded perspective view of an alternative embodiment of the present disclosure showing four of horizontal beams, six vertical corner posts having vertical support flanges and hardware for securing the horizontal beams, male and female connectors along the length of the vertical corner posts, and adjustable feet, creating a frame to which the interchangeable panels are secured and supported.

Referring to FIG. 11, an exploded perspective view of an alternative embodiment of an RHU frame of the present disclosure is shown and generally designated 160. RHU frame 160 is shown with two long horizontal beams 162 and two short horizontal beams 164, in addition to two one-story vertical corner posts 166 and two two-story vertical corner posts 168. Also pictured are the adjustable feet 136. A ceiling panel 102*b* and a wall panel 180 are shown in dashed lines where they would be placed in a completed RHU 120.

RHU frame 160 features a floor panel 170 having a frame 172 and a floor board 174. Similar to the previous embodiments, floor panel 170 has M locks 122 and F locks 124 disposed about the periphery of the frame 172 for connection to wall panels 102*a*. Frame 172 is a metal frame providing additional structural support to the entire RHU frame 160, further being formed with adjustable feet 176.

This Figure further indicates the various options available with the interchangeable components of the present disclosure. Horizontal beams 162 and 164 are not required to be of identical lengths, as shown, but may be formed of a suitable length required for a given design. Further, the vertical corner posts 166 can be manufactured in lengths that accommodate taller, two story structures. The embodiment described by this Figure also depicts vertical corner posts 166 and 168 formed with only one set of flanges 167. In this embodiment, construction of an RHU 100 requires the use of at least one floor panel 170. Alternatively, this RHU frame 160 may also be incorporated as a second story of a given RHU 100, since the ceiling of the lower story will become a floor for the second story.

During construction of an RHU 10, 100, 120, or 160, the floor is commonly the first portion of the assembly completed. Beginning initially with flat area, a single floor panel 170, as shown, the adjustable feet 176 can be utilized to ensure a level floor as a starting point. In a preferred embodiment, flat terrain with less than a four percent grade is optimum. Adjustable feet 176 are mounted on posts (not shown) threaded within each corner of frame 172 at adjustment points 178, as is known in the art. As such, the same tool 50 can be used to rotate adjustable feet 176 and extend or retract adjustable feet 176 at adjustment point 178.

Once the floor panel 170 is level, additional floor panels 170 can be laid down adjacent thereto in order to increase the footprint. Each is then secured using the M locks 122 and F locks 124 disposed about their periphery as described throughout. Wall panels 180 can then be attached to floor panel 170. Wall panels 180 are the same size and composition as wall panels 102*a*, with the option of having an interior ledge (not shown) analogous to ledge 40 from FIG. 4 providing support for the wall panel 180 during construction. Additionally, in an embodiment, wall pane 180 is formed with additional M locks 122 and F locks 124 horizontally disposed along the interior base of wall panel 180 in order to interface with those complementary M locks 122 and F locks 124 of floor panel 170.

In an embodiment, once the floor panels 170 and at least a wall panel 180 at a corner is in place, vertical corner posts 166 or 168 can then be attached as indicated. The adjustable feet 136 of a corner post 166 or 168 is adjusted to interface the M locks 122 and F locks 124 disposed along the length of corner post 166 or 168 with those of wall panel 180. Once a plurality of corner posts 166 or 168 are erected and secured to the respective wall panels 180, horizontal beams 162 or 164 are secured to flanges 167 allowing further construction of the ceiling and upper floors as described herein. It should be appreciated that in such an embodiment, the floor panel 170 is not directly connected to the vertical corner posts 166 or 168. Whereas a single ceiling panel 102*b* is shown in this Figure, the flexibility of the components allows expansion of the footprint to nearly any desirable floorplan.

Figure 12:
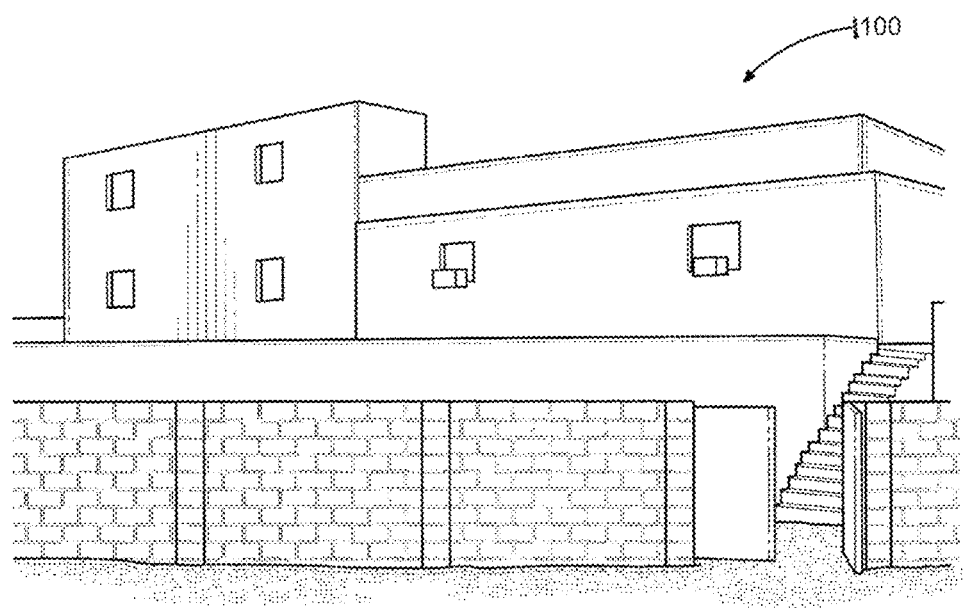
FIG. 12 is a front view of a preferred embodiment of a multi-story relocatable habitat unit, "sceniced" to resemble a fortress, showing the use of compound walls, and other features.

In an alternative embodiment, referring to FIG. 12, a preferred embodiment of a multi-story relocatable habitat unit ("RHU") of the present disclosure is shown and generally designated 1100. As will be explained more fully below, the entirety of the RHU is constructed using five basic parts and a single tool and can be sceniced to resemble a real world tactical environment. Stage production techniques are utilized to provide a real world environment, increasing the quality of tactical training while remaining flexible with the execution and assembly.

Figure 13:
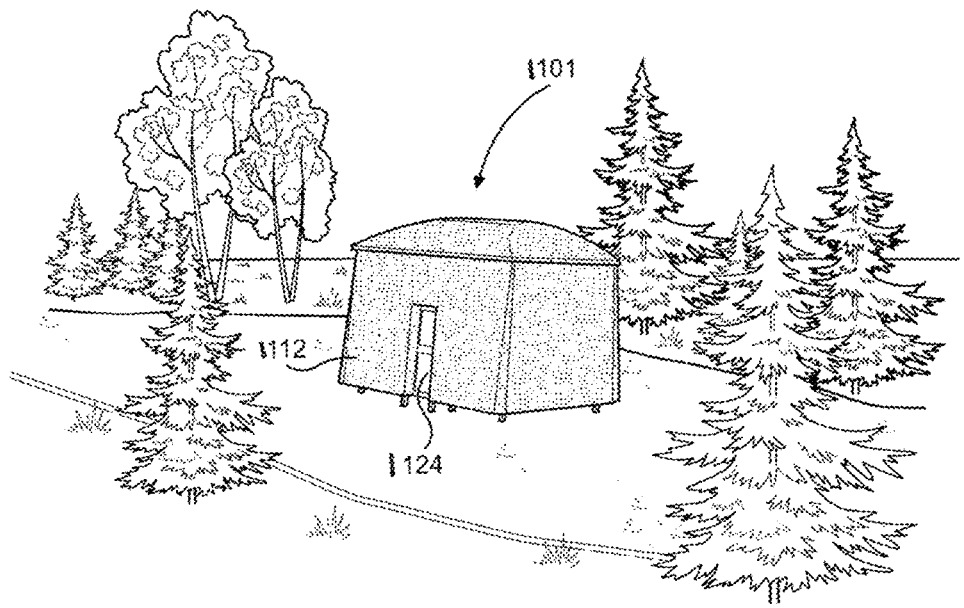
FIG. 13 is an alternative embodiment of a single story construction of the present disclosure showing another manner in which the relocatable habitat unit can be "sceniced" with additional props to resemble real world tactical environments.

Referring to FIG. 13, a preferred embodiment of a single level RHU of the present disclosure is shown a generally designated 1101. RHU 1101 is shown "sceniced" as a hut that might be found in a desert or grassland environment used to simulate real world tactical training. In this Figure a door 1124 is shown formed into a wall panel 1112, as will be discussed more fully below. As can be seen in this Figure, wall panels 1112 (explained more fully below) can be built to resemble buildings other than square structures. The illusion of the RHU 1101 having a wider base than top is provided by adding more material to the bottom portion of the panels 1112 than at the top.

Figure 14:
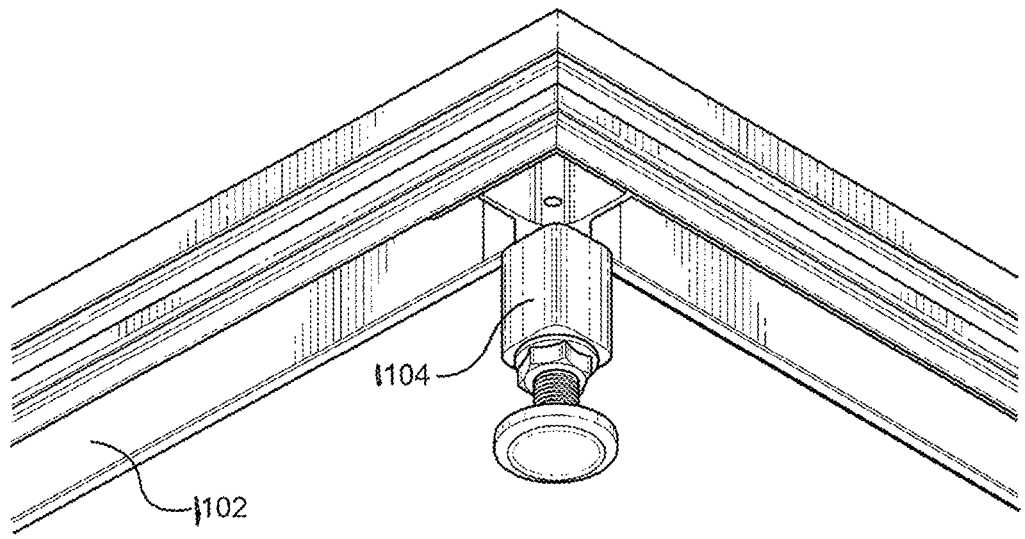
FIG. 14 is a perspective view of an adjustable foot module as it is mounted to the underside of a floor panel.

Referring now to FIG. 14, the construction of the RHU 1100 begins with one or more floor panels 1102, a portion of which is shown in this Figure with a single adjustable foot module 1104 attached. Adjustable foot module 1104 is utilized to level the floor panel in relatively flat terrain (preferably less than four percent grade). A single tool (not shown), typically a hex tool and a common ratchet can be employed to secure or adjust every attachment in the RHU 1100.

Floor panels are interchangeable with other floor panels and generally sturdy, being formed of a metal frame such as aluminum, steel, other suitable material, with a wooden or composite floor. Each floor panel 1102 is designed to withstand tactical training, on the first level or the second level of RHU 1100.

Figure 15:
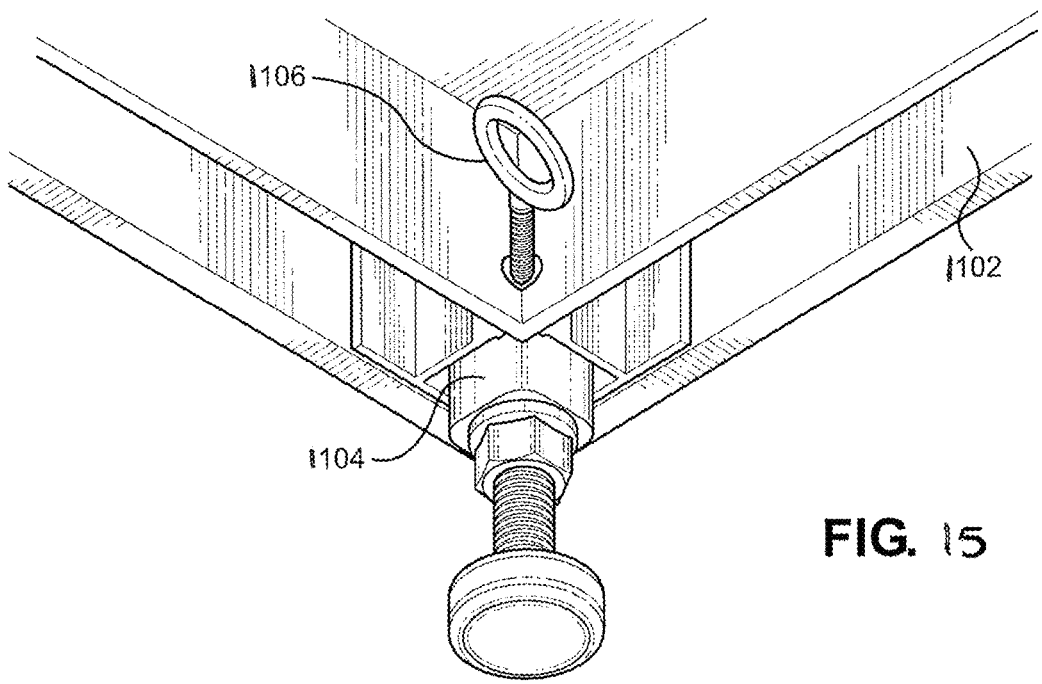
FIG. 15 is a bottom perspective view of the underside of the corner of a floor panel, showing the set screw that secured the adjustable foot module in place.

Referring now to FIG. 15, the underside of the floor panel 1102 is shown where adjustable foot module 1104 is inserted into a receiver formed in the floor panel 1102 and secured by a set screw 1106. The adjustable foot module 1104 can be used on any corner of any floor panel 1102 in use.

Figure 16:
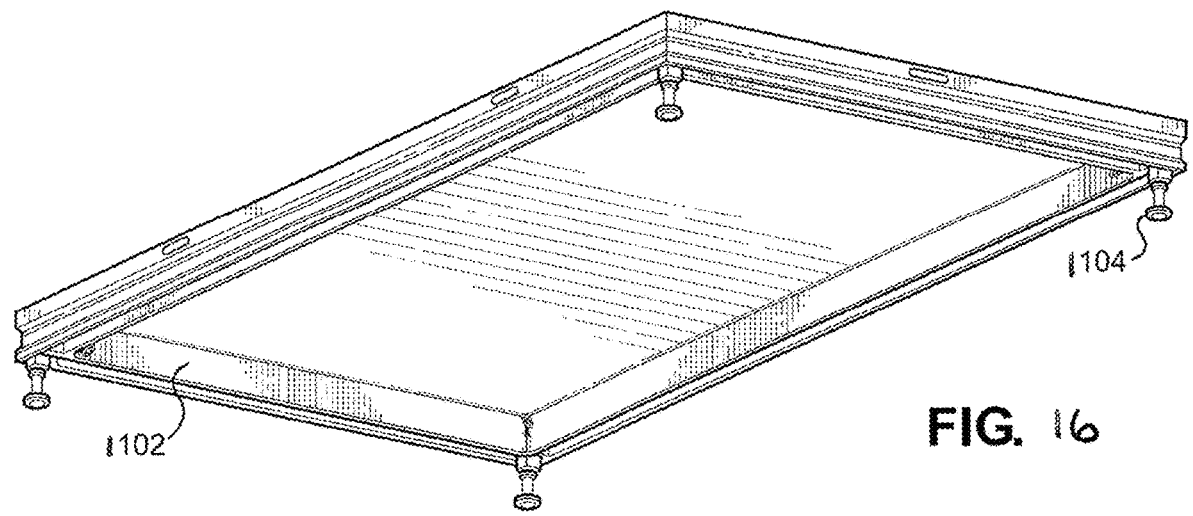
FIG. 16 is a perspective view of the bottom of a single floor panel, showing the frame, floor board, four adjustable foot modules, and the lock connectors on the visible sides.

Referring to FIG. 16, the underside of a floor panel 1102 is shown with four adjustable foot modules 1104 inserted into a receiver and secured allowing the user to level the floor panel on the terrain. Each of the floor panels is individually leveled with the adjacent floor panels 1102 to maintain a flat platform on which to construct the remainder of the RHU 1100.

Figure 17:
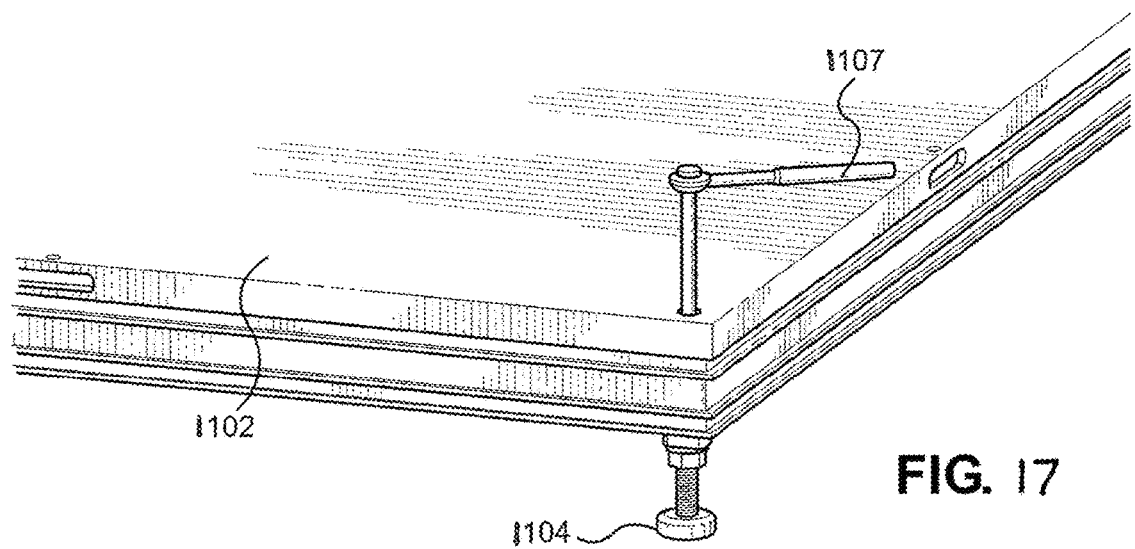
FIG. 17 is a perspective view of the top of a corner of a floor panel, showing a lock connector and the tool used to adjust the height of the adjustable foot module.

Referring to FIG. 17, the tool 1107 is inserted and engages with the adjustable foot module 1104 to adjust the height and level of the floor panel 1102. Tool 1107 is a notionally a common ratchet set with a hex tool, similar to an Allen wrench and will be used throughout construction of the RHU 1100.

Figure 18:
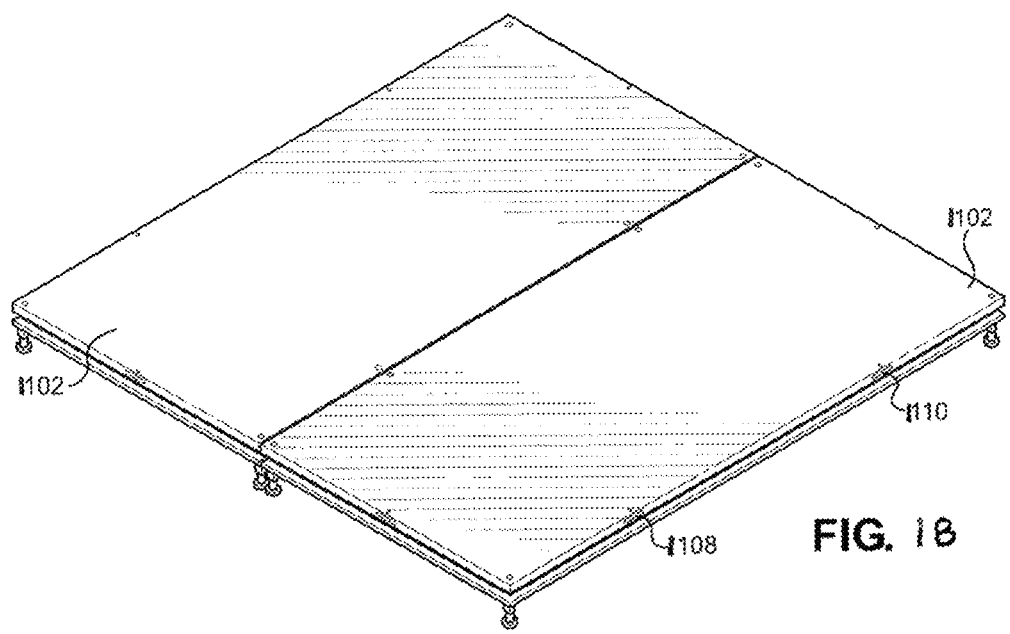
FIG. 18 is a perspective view of two floor boards after being leveled using the adjustable foot modules and connected together with each floor panel's respective lock connectors.

Referring to FIG. 18, multiple floor panels 1102 can then be leveled and attached along their adjacent edges through the use of male (M) lock connectors 1108 and female (F) lock connectors 1110. Two floor panels 1102 have been connected together, forming a larger floor that will form part of the base of RHU 1100. In a preferred embodiment of RHU 1100, any practical number of floor panels 1102 can be connected to create a larger floor plan. Tool 1107 is used to connect and disconnect lock connectors 1108 and 1110, and secure corner posts and ceiling beams to the RHU 1100.

Figure 19:
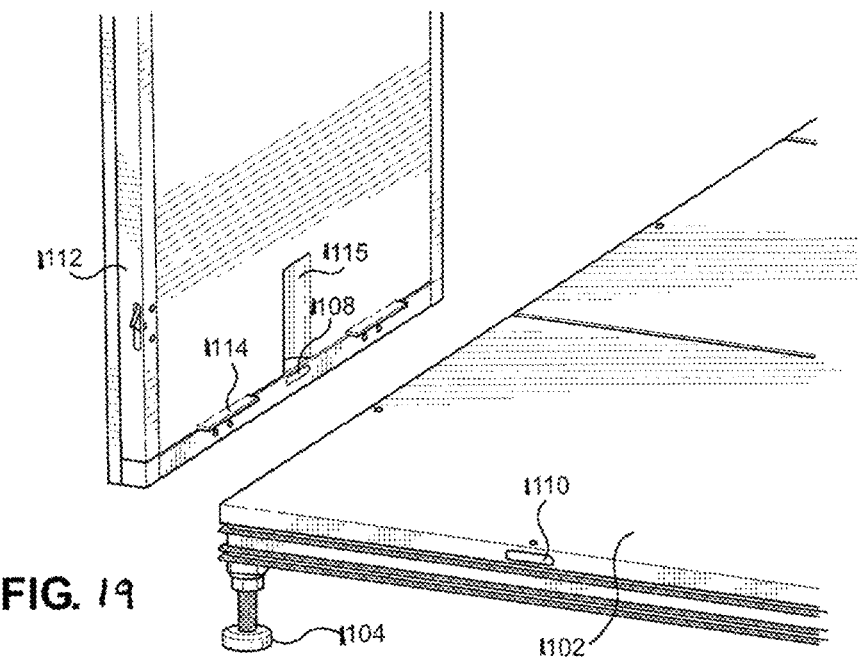
FIG. 19 is a perspective is a perspective view of a wall panel as it is attached to the edge of a floor panel, showing the access port for actuating the lock connector on the bottom edge of the wall panel, and the ledges that maintain the wall panel's position on the floor panel allowing the user to connect the wall panel to the floor panel with the lock connectors.

Referring to FIG. 19, a wall panel 1112 is shown as it would be attached to the edge of a floor panel 1102. The wall panel has ledges 1114 that aid in supporting the weight of the wall panels 1112, as the user is securing the M lock 1108 on the base of the wall panel 1112 to an F lock 1110 (not visible from this angle) on the edge of the floor panel 1102. Each of the wall panels 1112 has at least one M lock 1108 or at least one F lock 1110 along the interior face of the bottom edge, where the wall panel 1112 comes in contact with floor panel 1102. An access port 1115 provides the user with access to fit the tool 1107 and actuate the M lock 1108, as depicted by FIG. 20.

Figure 20:
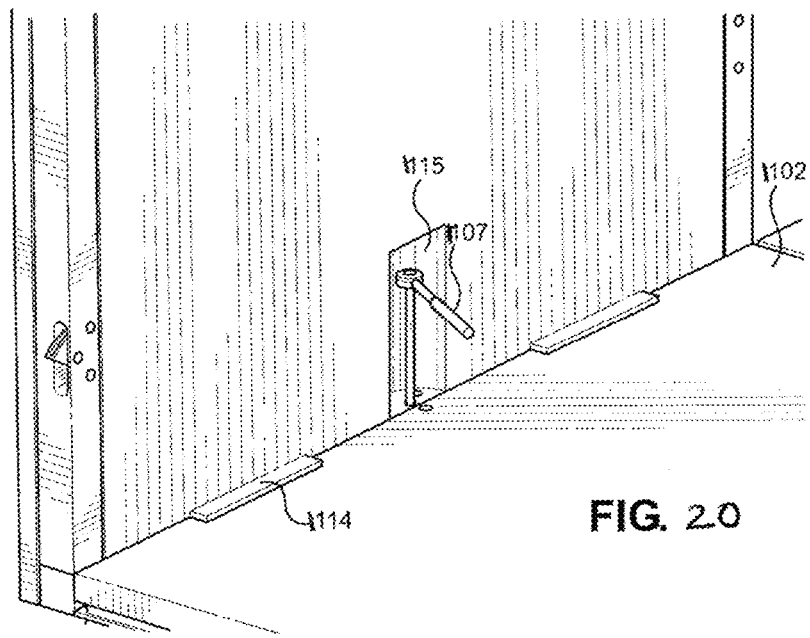
FIG. 20 is a perspective view of a wall panel as attached to a floor panel using the lock connectors, showing the ledges on the bottom edge of the wall panel holding the wall panel in place, and the tool as it would be inserted to actuate the lock connectors.

FIG. 20 shows a common ratchet as tool 1107 actuating the M lock 1108. Shown are ledges 1114 formed into the frame of wall panel 1112 that help support the weight of the wall panel 1112 during construction. The ledges 1114 are not intended to be critical load bearing members once the frame (shown in FIG. 10) of the RHU 1100 is complete.

Figure 21:
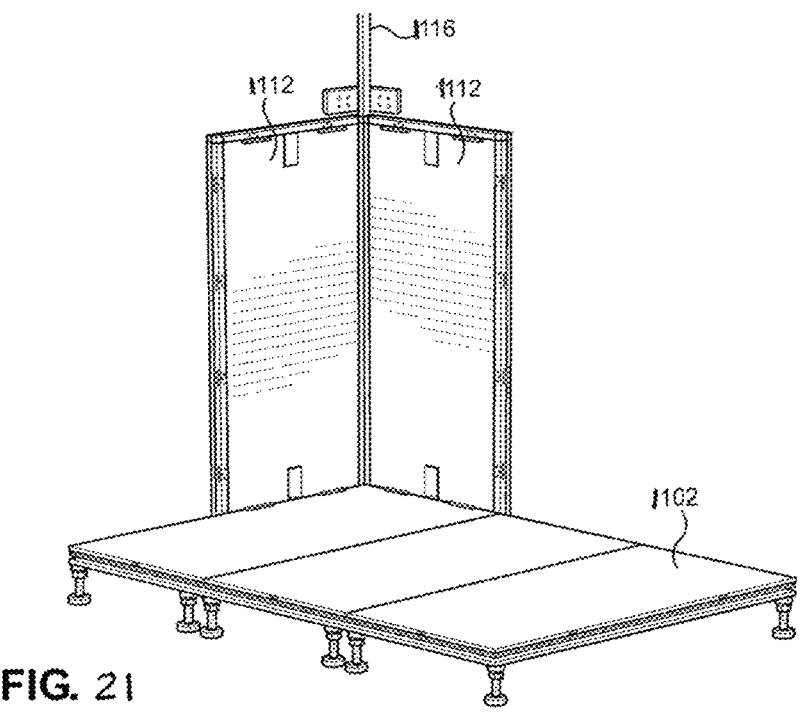
FIG. 21 is a perspective view of three floor panels connected forming a floor of a relocatable habitat unit, with two wall panels connected to the floor panels and to a corner post.

Referring to FIG. 21, two wall panels 1112 are shown connected to the floor panels 1102 through the use of the M locks 1108 and F locks 1110 (shown in FIG. 9). As the wall panels 1112 are secured in place, a corner post 1116 is connected to the first wall panel 1112 through the use of the M locks 1108 and F locks 1110. The corner post 1116 is an elongated, metal member with a roughly square cross section. At least two of the adjacent sides that meet wall panels 1112 at a given corner have M locks 1108 and F locks 1110 disposed about the length of the corner post 1116. In an embodiment, a corner post 1116 may be formed with appropriate lock connectors 1108 and 1110 as needed on more than two adjacent surfaces along the corner post's 1112 length to accommodate additional designs. Such an embodiment might require a T-shaped intersection where three walls come together, or even four walls, as required.

Figure 22:
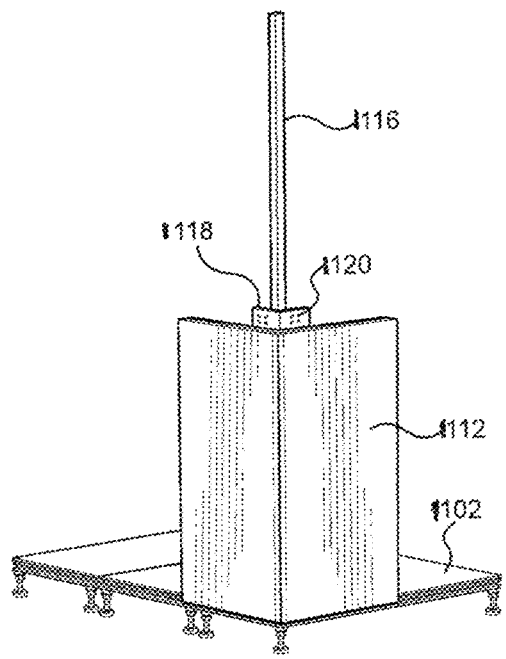
FIG. 22 is a perspective view of the outside of corner of FIG. 8, showing the interaction of the corner post as it connects to the two wall panels forming a corner of the relocatable habitat unit.

Referring to FIG. 22, an opposing view from that of FIG. 21 is shown. Corner post 1116 is connected along its length to two wall panels 1112 with the use of the M locks 1108 and F locks 1110 disposed one the edges. This Figure also shows the two flanges 1118 orthogonally disposed on adjacent sides of corner post 1116 at approximately the height of the wall panels 1112. Flanges 1118 are formed with holes 1120 to accept hardware 1122 that will ultimately secure ceiling beams (discussed below).

Figure 23:
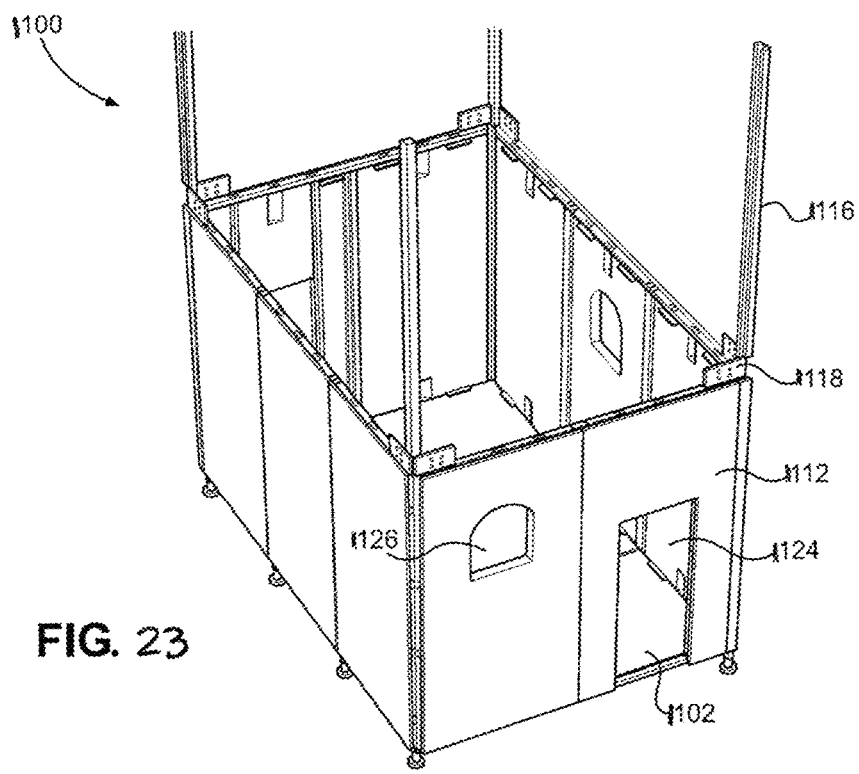
FIG. 23 is a perspective is a top perspective view of the bottom floor of a relocatable habitat unit prior to installation of the second story, showing eight wall panels installed forming the walls of the relocatable habitat unit, with two doors, and two windows.

Referring to FIG. 23, ten wall panels 1112 are erected around the edges of the three floor panels 1102 that form the floor of RHU 1100. Four corner posts 1116 are utilized to support the four corners of the first floor of the RHU 1100. As shown, the wall panels 1112 can be formed with one of several amenities common in a typical building. Amenities such as a door 1124 or a window 1126 can be formed into the wall panels 1112 as needed. Additionally, the wall panels are interchangeable, being identically built and reconfigurable once the RHU 1100 is complete.

In a preferred embodiment, wall panels 1112 are formed of a frame composed of pultruded fiberglass reinforced plastic beams, bonded with wood, composite, or expanded polystyrene foam panels that are laser cut and sceniced to replicate the look and texture of various building materials like brick, adobe, mud, wood, bamboo, straw, thatch, among other materials.

Because tactical military training often requires live ordnance, panels may become damaged. The ability to repair or quickly reconfigure a wall panel 1112 from a solid wall to a door 1124 or window 1126 panel is of great utility saving considerable time and money.

Figure 24:
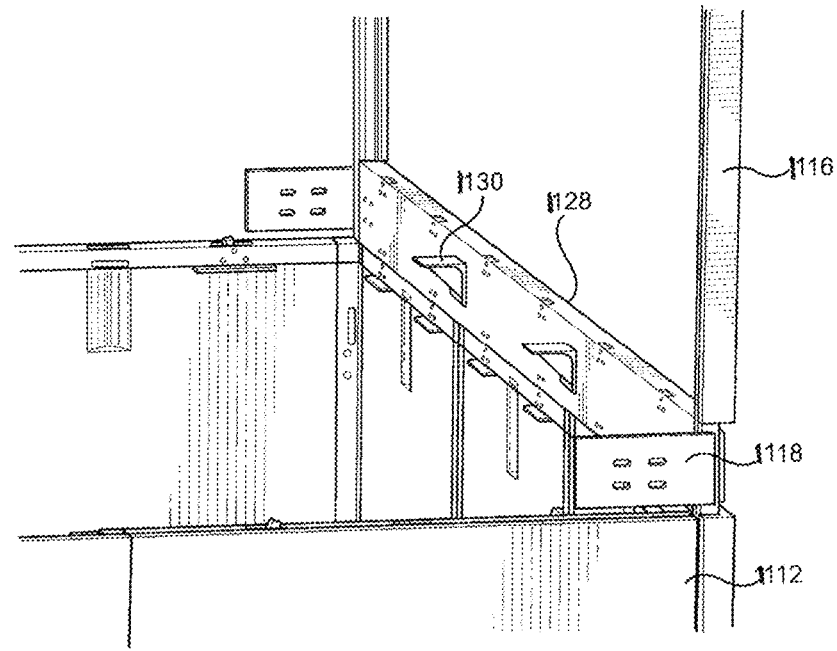
FIG. 24 is a view of two corner posts as they interact with a ceiling beam, showing the flanges formed to the corner posts that connect to the ceiling beams, and the ledges formed into the ceiling beam for support of the second story floor.

Referring now to FIG. 24, to construct the ceiling attachment assembly, a ceiling beam 1128 is secured between flanges 1118 in order to both provide structural support to the wall panels 1112, but also to support the second floor of RHU 1100. Tabs 1130 are also formed to the interior of beam 1128 supplying additional support to the floor panels 1102 (shown in FIGS. 14-23) that will be employed as the ceiling, or floor of the second story.

Figure 25:
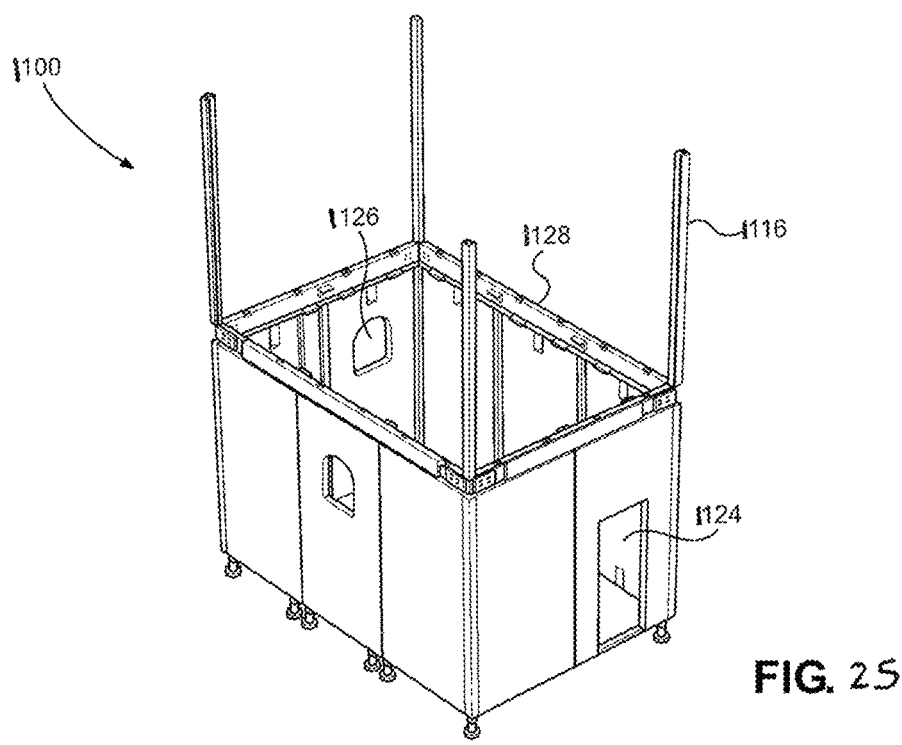
FIG. 25 is a top perspective view of a complete first story of a relocatable habitat unit prior to the installation of the second story floor, showing four ceiling beams installed between the four corner posts for support of the second floor.

Referring now to FIG. 25, a top perspective view of the first story of the RHU 1100 after the remaining ceiling beams 1128 are installed creating the ceiling attachment assembly to which the ceiling or next story will be secured is shown.

Figure 26:
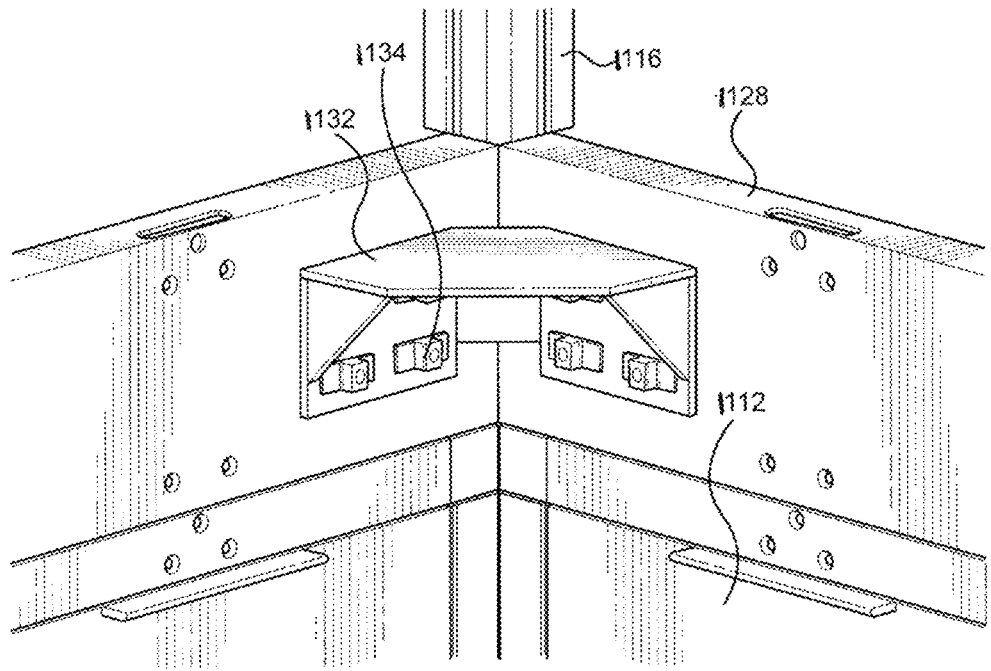
FIG. 26 is a perspective view of the interior of the corner post where the flanges and ceiling beams meet, showing a corner bracket installed, with the hardware inserted through the flanges, through the ceiling beams, and into the cage nuts formed onto the interior of the corner bracket.

Referring to FIG. 26 an interior view of a corner bracket 1132 is shown installed in the corner where two ceiling beams 1128 meet. The corner bracket 1132 is formed with at least two orthogonal faces that meet flanges 1118 (shown in FIGS. 22-24), and holes 1134 sized to receive hardware 1136 (shown in FIG. 27). Hardware is notionally a bolt, capable of being driven by tool 1107, maintaining the simplicity of construction. Additionally, holes 1134 in corner bracket 1132 can either be internally threaded or alternatively be equipped with cage nuts connected or otherwise formed to the interior of the corner bracket 1132. In an embodiment, just as tabs 1130 assist in supporting the floor panels 1112 of the second story (or ceiling of the first story), the tops of corner bracket 1132 are formed to assist in the support of the same.

Figure 27:
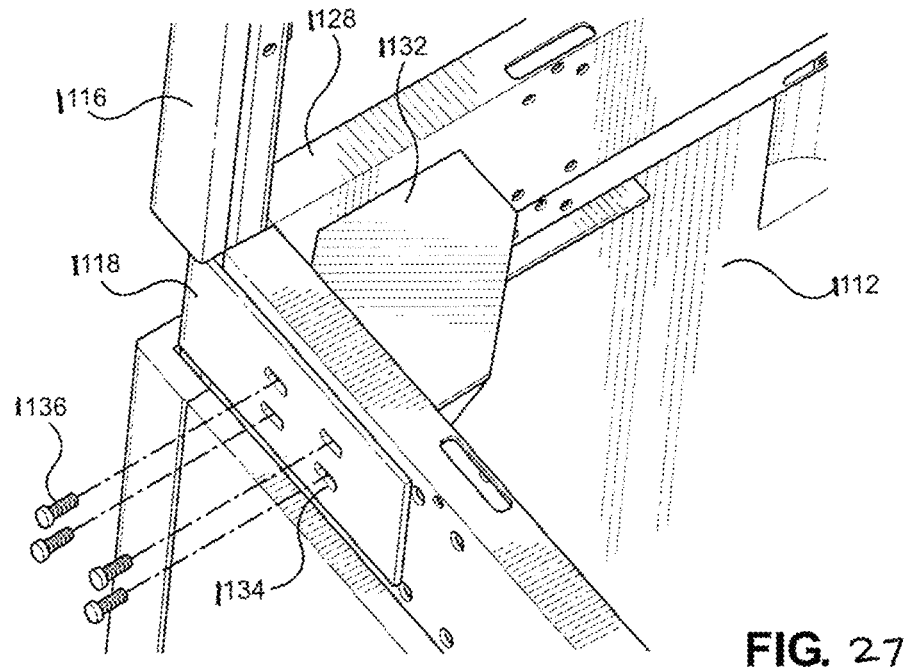
FIG. 27 is a perspective view of the top of a corner bracket as installed in a relocatable habitat unit, showing the interaction of two ceiling beams, corner post, and the top of the corner bracket that also serves to support the second story floor.

Referring to FIG. 27, a perspective view of the top of a corner bracket 1132 is shown as installed between two ceiling beams 1128. Hardware 1136 is more clearly shown here as it is inserted to secure the components together.

Figure 28:
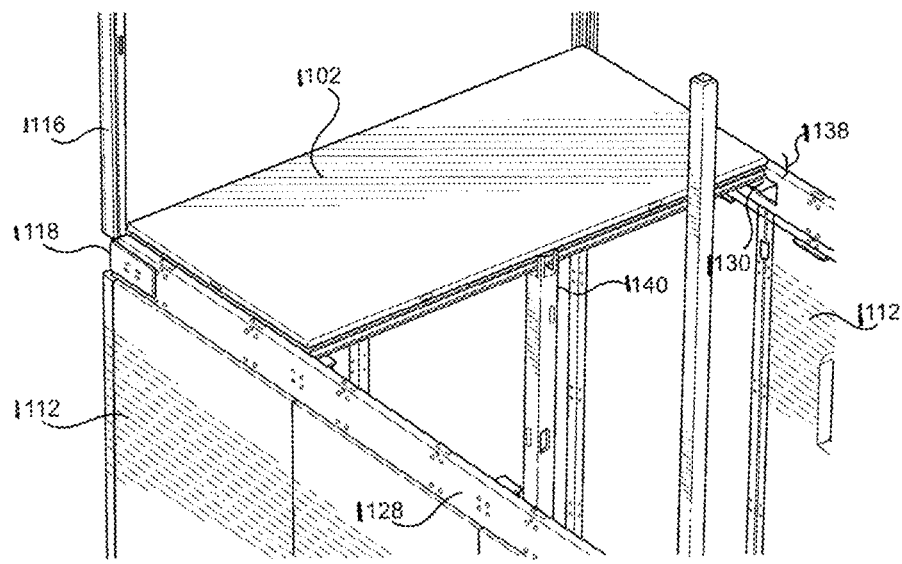
FIG. 28 is a top view of the installation of the second story floor, showing the lock connectors and the interaction of the edges of the floor panel as is lies atop the ceiling beam flanges and the corner brackets, in addition to a four by four support post installed to support the second story.

Referring now to FIG. 28, the beginning of installation of the second story floor of the RHU 1100 is shown, with the addition of a first floor panel 1102. Floor panels on a second story of an RHU 1100 do not physically attach to the ceiling beams 1128, but rather rest on the tabs 1130 and the corner brackets 1132 (shown in FIGS. 26-27). The top surface of the tabs 1130 and the corner brackets 1132 lies below the top of ceiling beams 1128 creating a ridge 1138 that helps maintain the position of floor panels 1102 in use as a second story floor of RHU 1100. In order to maintain integrity of the floor panels 1102, each of the panels 1102 in use is connected to the adjacent floor panel 1102 with the use of lock connectors 1108 and 1110.

This Figure also shows the addition of support post 1140 as it is installed to provide additional support to the floor panels 1102 as they are installed on the second floor and will support the intersection of the three floor panels 1102 in use in this embodiment of RHU 1100.

Support post 1140 is provided to create a more secure upper floor. As the surface area of a second story of a multi-level RHU 1100 increases, the amount of support to maintain a level second floor also increases. Support post 1140 is notionally a four-by-four beam made from any of a number of materials from a composite to metal or wooden members. While weight is a concern, the more important aspect is safety and security of RHU 1100.

Figure 29:
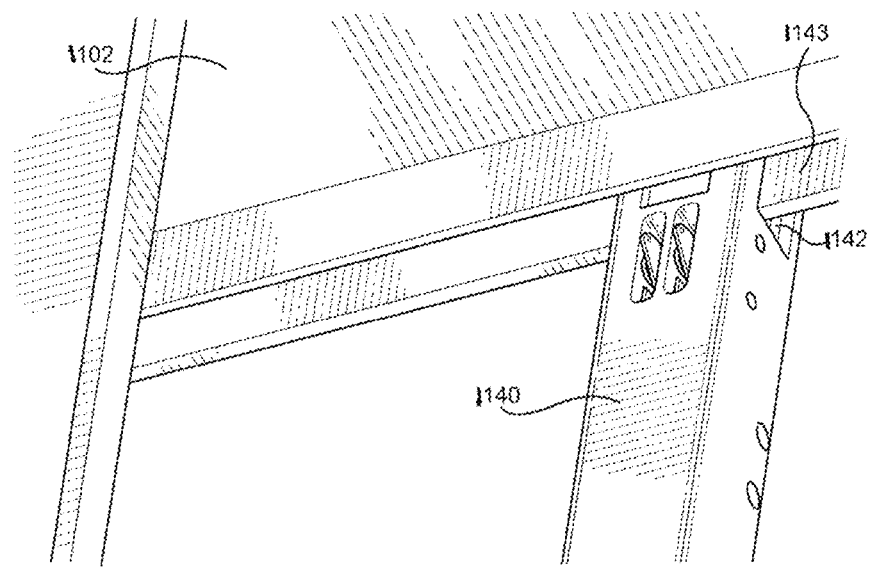
FIG. 29 is a perspective view of the underside of a second story floor panel where the four-by-four support post is installed.

FIG. 29 is a perspective view of the interaction of the support post 1140 with the bottom of the floor panel 1102. The support post 1140 has a registration pin (not shown) in the bottom, that fits into the registration hole (not shown) in the floor panel 1102. The registration hole indicates a strong point in the floor, generally positioned over an intersection of floor panels 1102 where the increased support of the adjustable foot module 1104 (shown in FIGS. 25-29) is located. Thus, support post 1140 transfers the load from the intersection of second story floor panels 1102, to the ground through the foot module 1104, decreasing the sheer stresses applied to the floor panels 1102 that comprise the second floor of RHU 1100.

Figure 30:
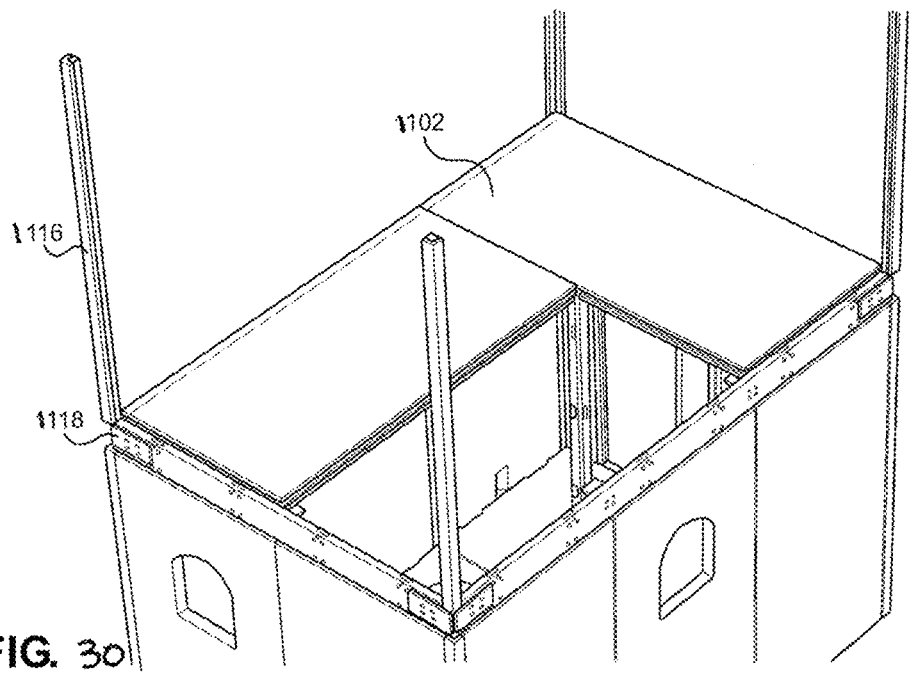
FIG. 30 is perspective view of the top of a partially constructed relocatable habitat unit showing the installation of a second floor panel for the second story, offset orientation of the second story floor panels, and the location and interaction of the four-by-four support post.
Figure 31:
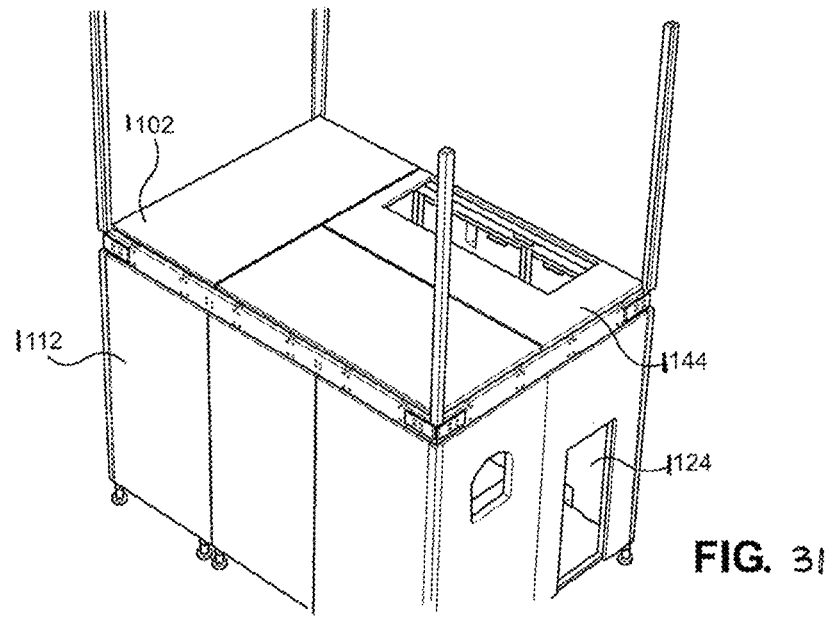
FIG. 31 is a perspective view of the top of the partially constructed relocatable habitat unit showing the installation of the third second story floor panel having a void adapted to accept a staircase.

Notches 1142 formed in the top of the support post 1140 are sized to accept the rails 1143 formed in the bottom of the second story floor panel. The remaining floor panels 1102 are intended to be oriented 90.degree. from the first panel, as shown in FIGS. 30 and 31. This scheme of manipulating the orientation of the second story floor panels 1102 more evenly distributes the loads applied to the second story and ensures a more structurally sound RHU 1100. In an embodiment, it is desirable to support each second story floor panel 1102 about all four corners.

Referring to FIG. 30 a second floor panel 1102 is installed on the second story floor of RHU 1100, supported on each corner and connected to the adjacent floor panel 1102 with lock connectors 1108 and 1110.

In FIG. 31, the third and final second floor panel 1102 installed on the second story floor of RHU 1100 is shown, this time modified as a stairwell panel 1144, providing a means for installation of a staircase 1146 (shown in FIG. 33) and access to the second story of the RHU 1100.

Figure 32:
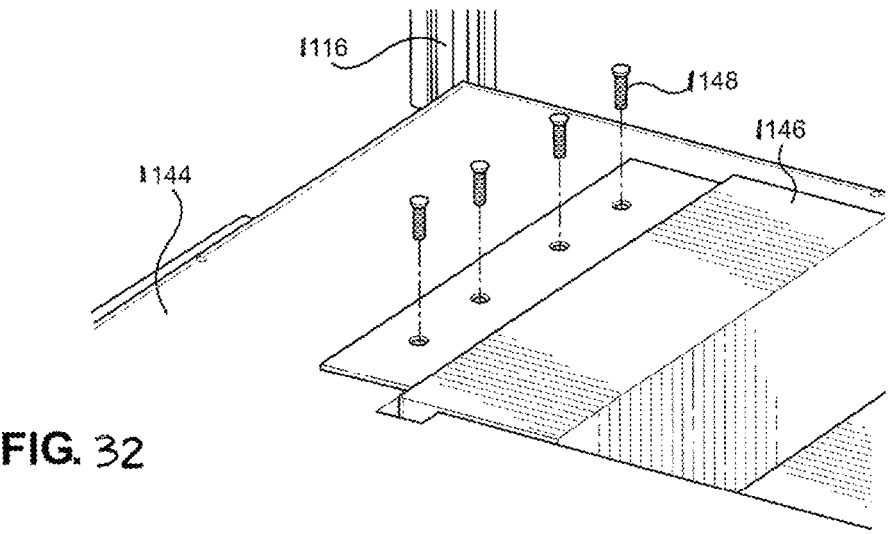
FIG. 32 is a perspective view of the installation of the hardware for securing the top of the staircase following installation in the relocatable habitat unit.

FIG. 32 shows the close up of the installation of a staircase 1146, and hardware 1148 as would be used to secure the staircase 1146 to the stairwell panel 1144.

Figure 33:
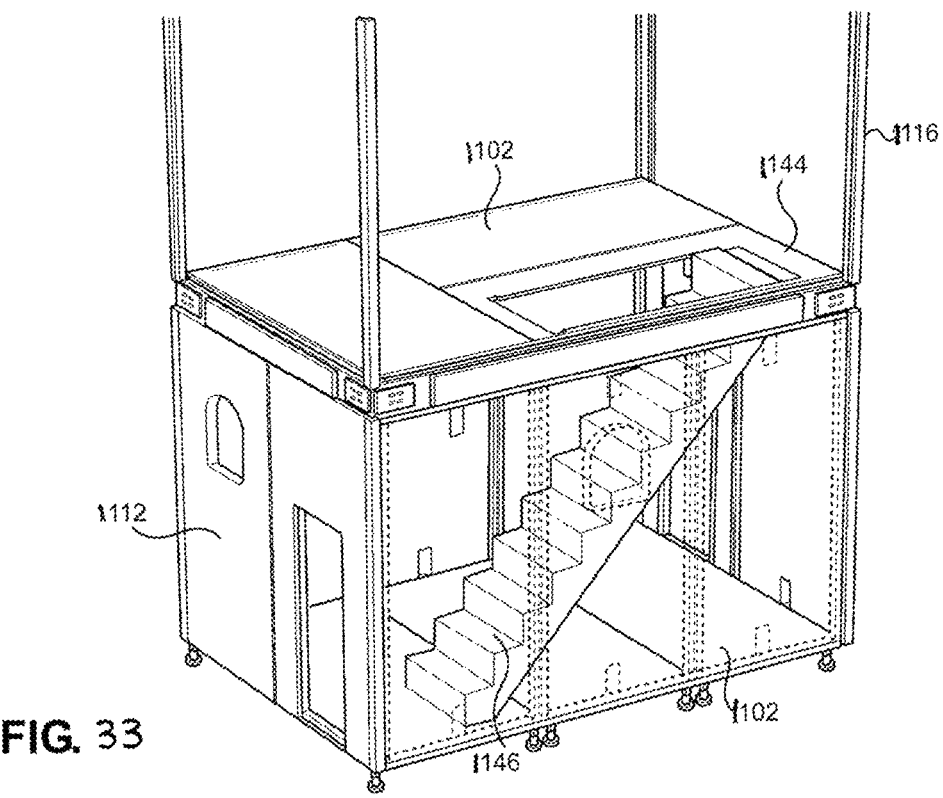
FIG. 33 is a perspective side view of a completed first story of a relocatable habitat unit showing a look-through view of the interior of the first floor with a staircase installed for access to the second floor.

Referring to FIG. 33, a side perspective of an almost complete RHU 1100 is shown with a look-through to the staircase 1146 and the completed first floor.

Figure 34:
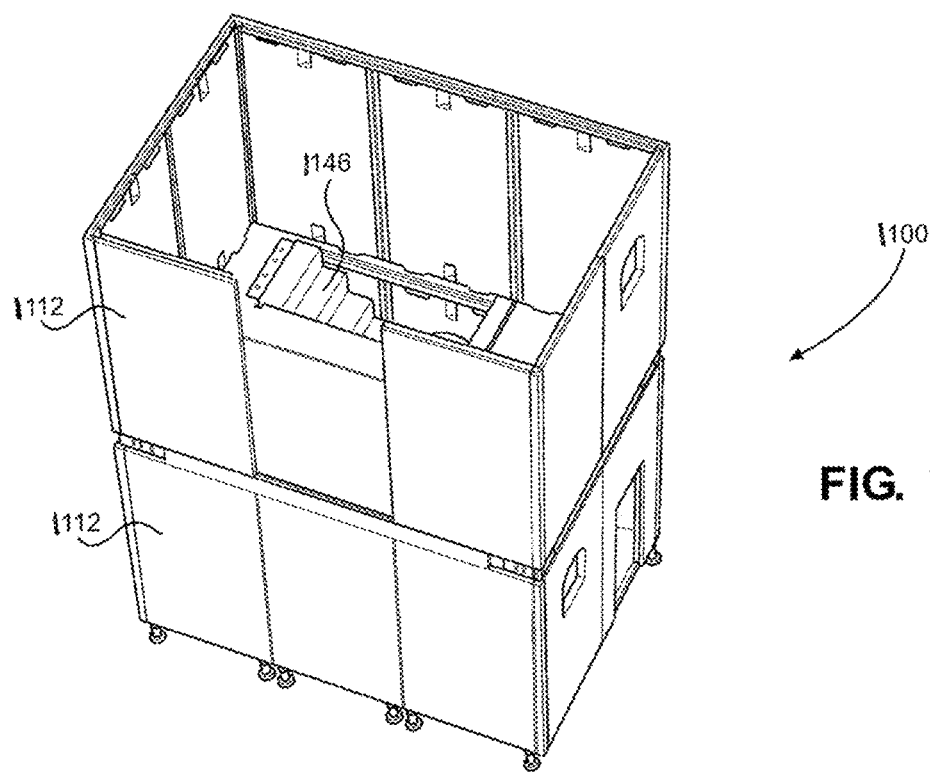
FIG. 34 is a perspective view of the top of the nearly completed second story of the relocatable habitat unit showing the top access of the staircase and nine of the ten required panels for the top floor.

Referring to FIG. 34, construction of the walls, using additional wall panels 1112 continues as the second story is shown nearly enclosed with nine out of ten wall panels 1112 installed. As before, the corner posts secure to adjacent wall panels 1112 using lock connectors 1108 and 1110, in the same manner in which the lock connectors 1108 and 1110 are used to secure adjacent wall panels 1112 together.

Figure 35:
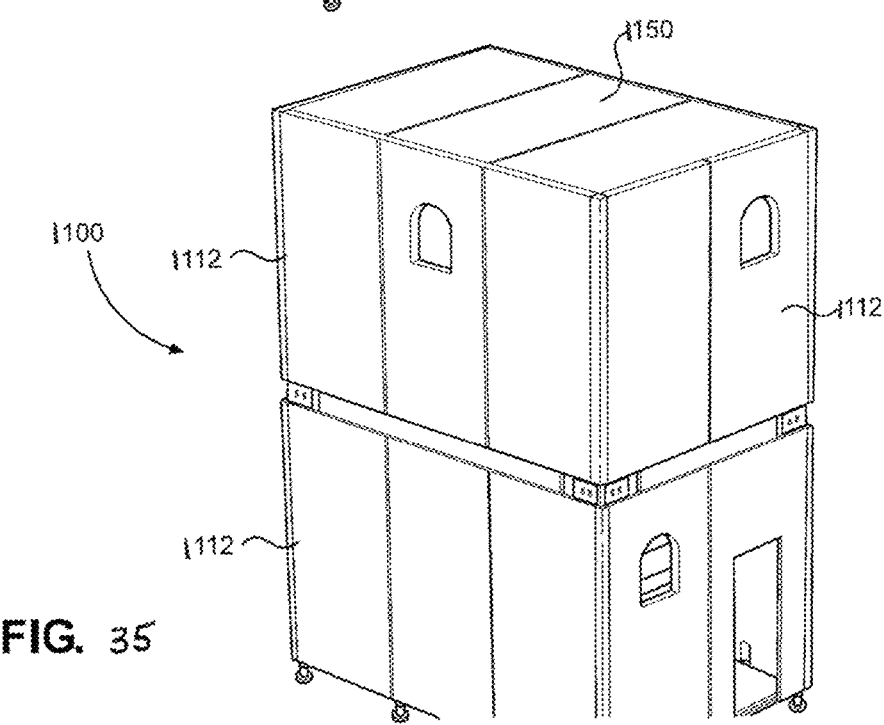
FIG. 35 is a perspective view of a completed two story relocatable habitat unit showing the roof panels installed on top of the second story.

Referring to FIG. 35, flat roof panels 1150 are installed in the same manner in which the floor panels 1102 were installed to create the floor of the second story. All flat roof panels 1150 are identical and are substantially similar to floor panels 1102. Like floor panels 1102, flat roof panels 1150 have male lock connectors 1108 on two sides and female lock connectors 1110 on two sides. With the wall panels 1112 locked into the floor, the lock connectors 1108 and 1110 in the wall panels 1112 will be the correct gender to mate with the roof panels 1150. Note the position of the wall locks and rotate the roof panel to mate with them. The tool 1107 (shown in FIGS. 17 and 20) is again used to actuate the individual male lock connectors 108 to lock the panels 1112 and 1150 into place.

Figure 36:
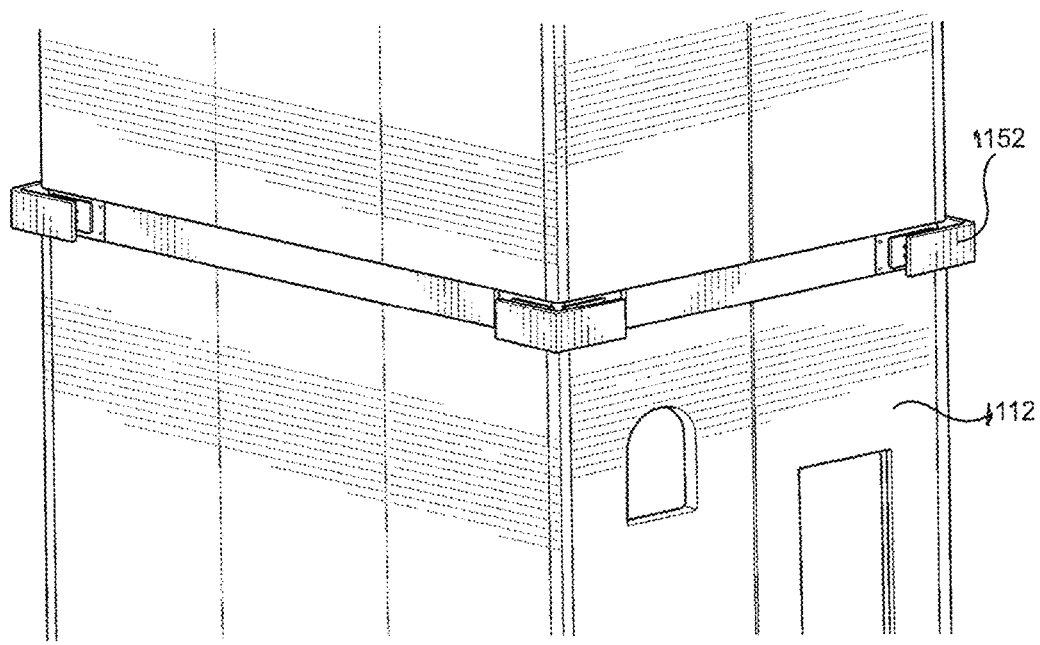
FIG. 36 is a side view of the installation of the corner post covers that magnetically adhere to the corner post flanges and complete the exterior finish.

The last step in the process of construction of RHU 1100 is the addition of the foam corner pieces 1152 as shown in FIG. 36. Foam corner pieces are formed with a magnetic backing that adheres to the exterior of flanges 1118 (shown in FIGS. 22-24) on corner posts 1116 (shown in FIGS. 21-34). Alternatively, the foam corner pieces 1152 may be attached by utilizing snap locks, hook and loop fasteners, or any other similar fastening methods known in the art.

Figure 37:
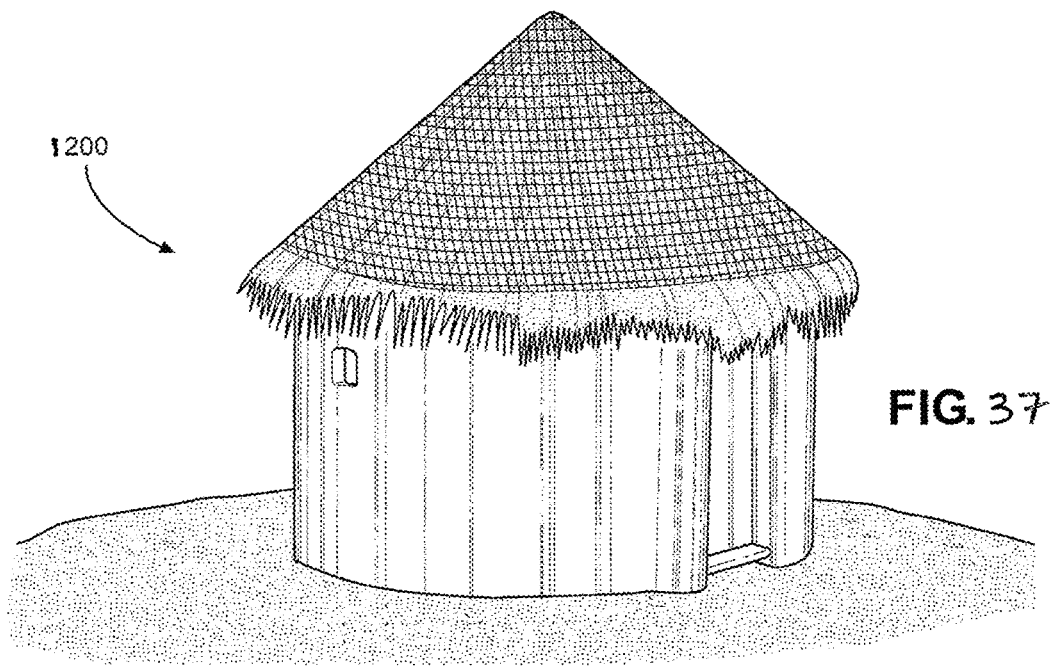
FIG. 37 is a perspective view of the side of a preferred embodiment of the present in disclosure showing the one of the many ways in which the relocatable habitat unit can be "sceniced" to resemble a real world building, yet still use the basic units of construction discussed herein.

Referring to FIG. 37, an alternative preferred embodiment of RHU of the present disclosure is shown and generally designated 1200. RHU 1200 is a round construction, resulting from the ability to vary the shape of the roof panels 1150 and the floor panels 1102. In an embodiment, the wall panels 1112 need not be symmetrical or uniformly thick throughout their construction adding an illusion that the building is not perfectly square as in RHU 1101 of FIG. 35. While the shape and cut of the panels that comprise the round RHU 1200 are not exactly the same size or shape as the floor panels 1102, wall panels 1112, and roof panels 1150, the same concepts and mechanisms are at work. Assembly and disassembly of RHU 1200 is as fast and easy and uses the same tool 1107 as above.

Figure 38:
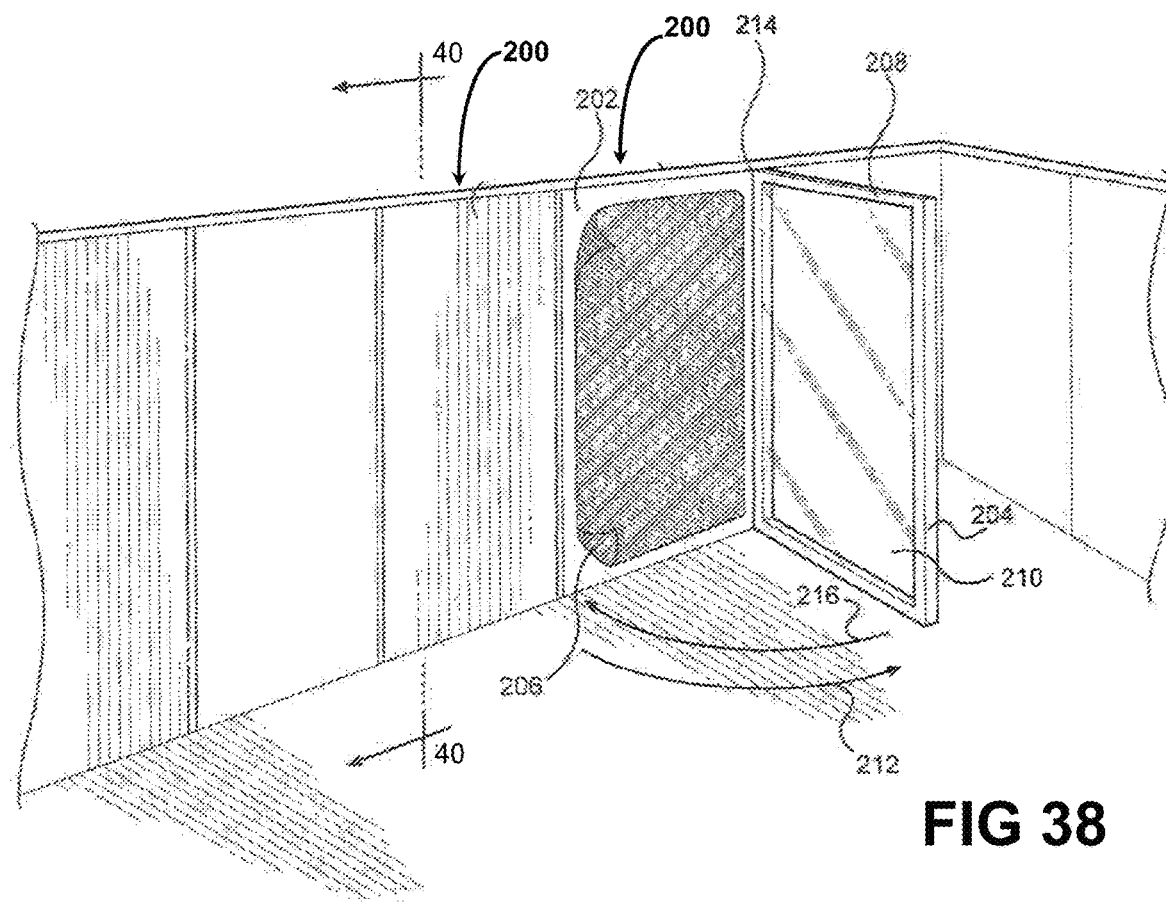
FIG. 38 is a diagrammatic view of a preferred embodiment of the present disclosure, including an interchangeable panel having an outer wall and an inner wall construction, defining an internal cavity formed to accept radio frequency-interactive material that is freely reconfigurable.

Referring now to FIG. 38, a partial construction of a Relocatable Habitat Unit (RHU) simulating a real building structure is shown, erected using an alternative preferred embodiment of an interchangeable panel of the present disclosure. Here, RHU 2000 may be substantially similar the various RHU's disclosed above, with the exception of including at least one panel 200 for simulating a building structure component made of a structural material. In particular, panel 200 is electromagnetically interactive outside of the visible spectrum.

As above, panel 200 may have the same or similar general physical characteristics of panel 102, including being lightweight yet visibly appearing as real wall, and having the same or similar interchangeability, same or similar dimensions, and same or similar connection points or interlock connectors as previous embodiments (e.g., with M locks 122 and F locks 124 spaced about the periphery).

An important distinction, however, from the previously disclosed panels 102 is the inclusion of an electromagnetic interaction simulator. In particular, the panel 200 may include an assembly, a component, and/or a material configured to mimic or otherwise simulate real world structural materials in an electromagnetic domain. As shown, the panel 200 may generally include an outer wall 202 and at least one sheet or layer of electromagnetically interactive material (discussed further below).

As discussed above, RHU 2000 may incorporate realistic looking wall panels that mimic real world building materials in visual appearance. However, real world walls typically also have other properties related to their "appearance" or "signature" to non-visual EM transmissions (i.e., the real world wall's EM response, interaction, reaction), and/or to their own emissions (e.g., the real world wall's heat discharge, EM response/interaction/reaction to transmissions originating from opposite the wall relative to an observer, etc.).

In contrast to a real world wall, panel 102 (or panel 200 with an empty cavity 210) may have very high transmittance when formed of expanded polystyrene ("EPS"). In particular, EPS is known for both high transmissivity and low reflectivity, making it almost invisible (and transparent) to a radar pulse or many other EM emissions. In fact, EPS, or Styrofoam, is commonly used to conceal antennae as Styrofoam is known for superior RF propagation. EPS foam is even transmissive to visible light under certain circumstances. Further, it is also well known in the art that EPS with a weight density less than two pounds per cubic foot ("pcf") has nearly negligible radar reflectivity unless the surface area is very large and the radar transmissions are incident at a right angle to the surface. Therefore even if an RHU 100 visually appears like it is made of adobe or brick and mortar, the RF characteristics of panel 102 do not realistically simulate the same. Radar and other EM transmissions simply pass directly through the EPS panels.

These characteristics may be important in many military training evolutions involving signals exploitation. For example, in a passive signals exploitation environment, where a trainee is required to detect, identify, and track enemy radio, radar, or other EM signals, if the subject emitter were inside an RHU 100 or 120 having EPS panels 102, the trainee would receive and detect artificially high-power RF signals because the EPS is effectively transparent to the emitter within, and does not offer any appreciable attenuation of the transmissions. Ultimately this situation would degrade the level of training due to the unrealistic results. Transmittance is then an important design factor when creating a simulated building.

Moreover, in an environment where active signals are used to detect live actors on the other side of a barrier, or within a given structure using x-rays or ultrawide band signals, reflectivity, absorption, and transmittance are again important characteristics that must be considered when designing a barrier to replicate a desired building material. Even though an RHU 100 is sceniced to look like concrete or adobe, a standard interchangeable wall 102 composed of EPS foam according to the present disclosure will not adequately replicate or otherwise be consistent with a solid concrete wall, for instance, which would be otherwise nearly opaque to a radar pulse, or other EM radiation. Accordingly, panel 200 may include features that mimic or otherwise are consistent/coordinated with non-optical characteristics of the building materials being simulated.

According to one embodiment, the panel 200 may include radio frequency ("RF") interactive materials 206 affixed to an inner side (i.e., opposite an outside observer) of the outer wall 202, and configured to simulate the electromagnetic response in a radio frequency domain of a structural material being simulated. Beneficially, the RF interactive materials 206 may interact with RF transmissions through the panel 200 in a similar manner as the real world building material being simulated, and without being visible to the outside observer. It is understood that the RF interactive materials 206 may be affixed to an outer side (i.e., opposite an inside viewer) of the outer wall 202 where the simulation is directed toward a trainee inside the structure. It is further understood that the RF interactive materials 206 may be embedded within the panel 200 (as discussed below), particularly where the visual appearance of both sides of the panel 200 are being simulated.

Preferably, the electromagnetic interaction simulator will be coordinated with the outward visual appearance of the panel 200 (i.e., the panel will resemble the real building material both visually and in the desired electromagnetic domain). In order to provide realistic military training with personnel as well as with systems, the RF material 206 is provided to manipulate RF transmittance or RF reflectivity of a given panel 200 as incorporated into RHU 2000 (alternately, retrofitting RHU 100 or RHU 120, for example). In particular, RF material 206 provides a mechanism to allow an otherwise "EM-transparent EPS foam wall to take on the transmittance, reflectivity, and EM absorbent qualities of a solid barrier such as concrete or adobe, among other materials. In other words, coordinating the electromagnetic interaction simulator with the outward visual appearance of the panel 200 may include selecting, matching, or otherwise tuning the electromagnetic interaction simulator (here, RF material 206) to respond like the material being simulated, in the desired non-visual EM domain.

Figure 39:
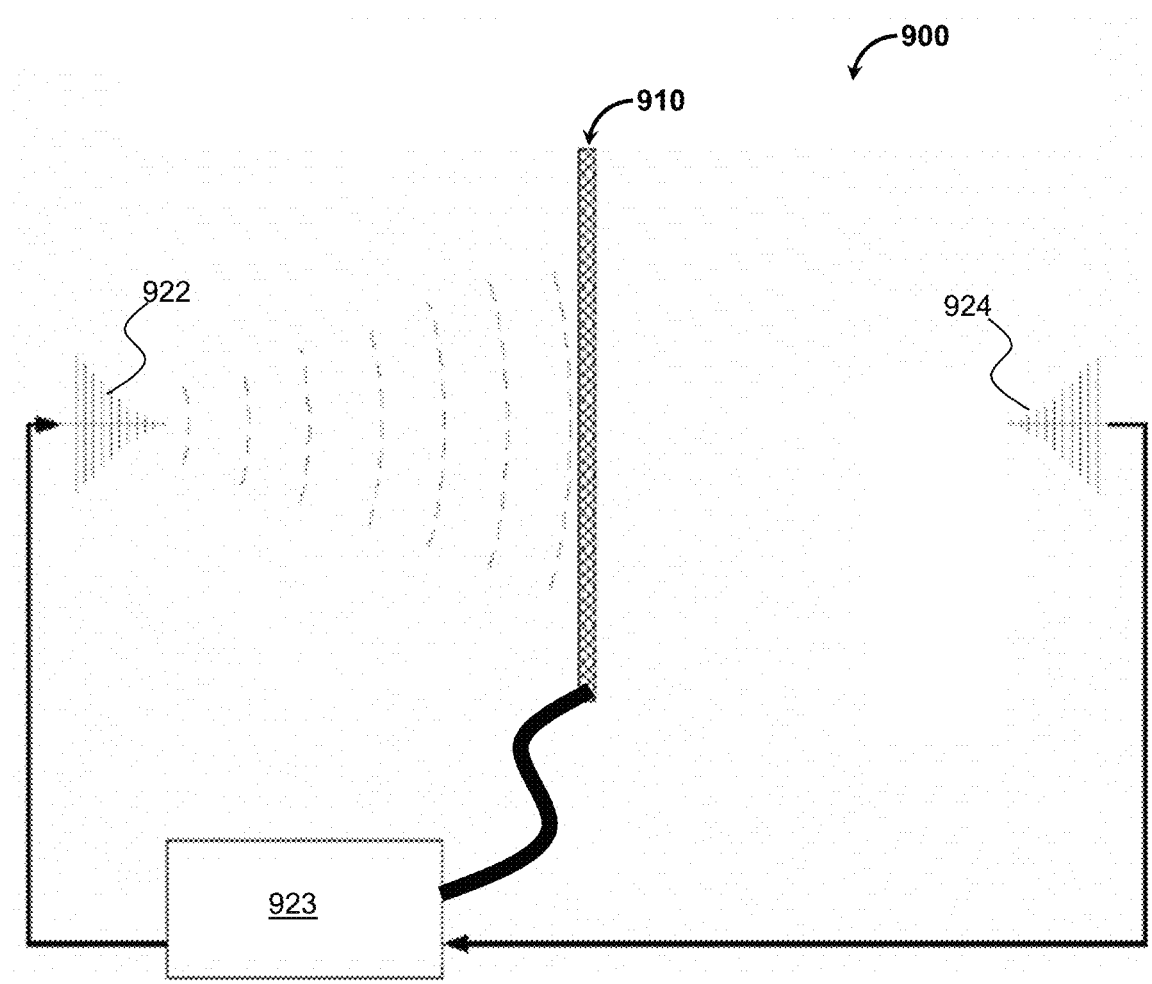
FIG. 39 is a schematic diagram of test setup to compare an RHU panel against other panels and materials.

FIG. 39 is a schematic diagram of test setup to compare an RHU panel against other panels and materials. Here, the test setup 900 includes an exemplary panel 910 (e.g., panel 200, 300, 400, 500) including a passive RF material and/or a thermal material) is positioned between a transmitter 922 and a receiver 924, where at least one property of the may be measured and analyzed by test equipment 923. Further, active features may be tested as well (e.g., panel 500 powered by similar or equivalent supply provided by the test equipment 923). As discussed herein, the test setup 900 may be used to identify a response or signature of exemplary panel 910 and/or may be used to tune the exemplary panel 910 to a desired response or signature or as needed.

In actual field testing, both a retrofitted single story RHU 120 and a two-story RHU 100 were subjected to RF transmissions from 0-6000 MHz to determine the particular path loss resultant of a given RF material 206 placed within the cavity 210 of multiple panels 200. Tests were run using heavyweight and lightweight metal mesh, among other materials. Metal mesh materials with varying mesh patterns, wire gauge sizes, and metallic composition all affect the EM absorbent or reflective characteristics of the mesh. Other test runs measured the transmittance of concrete and adobe, among other materials, to determine baseline transmittance measurements in a particular environment for those materials.

It was noted through testing that the composition and thickness of the material, as well as the emitted frequency and power, have a dramatic effect on the attenuation of the incident signal. In particular, the tests consisted of an antenna situated a distance away from the receiver. As a control, the transmission strengths were recorded with nothing positioned between the emitter and receiver. This provided a baseline signal strength to which the test results would be compared. The actual tests were subsequently conducted with the various materials such as mesh and EPS interposed between the transmitter and receiver.

The results indicated the heavyweight metal mesh had the highest overall attenuation, but that the 14 inch adobe wall had even more significant attenuation "drop off" above 3.5 GHz. The EPS foam walls had statistically insignificant attenuation. As a result, it became clear that various RF materials 206 can be placed within the cavity 210 of panel 200 to simulate real world conditions. Indeed, metallic foil or metalized film can be incorporated along with the mesh to reflect a portion of incident EM radiation.

Returning to FIG. 38, as above, according to one embodiment, panel 200 may generally include an electromagnetic interaction simulator such as an RF-interactive material ("RF material") 206 affixed to an outer wall 202. Preferably, the RF material 206 will be positioned in an inner side of the outer wall 202. For example, the outer wall 202 may be sceniced to visually appear as the building material being mimicked, with the RF material 206 configured to simulate the RF characteristics of said building material while hidden inside RHU 100. It should be understood, the RF material 206 may be affixed to the outer wall 202 directly (e.g., adhesives, fasteners, anchors, bonded/sprayed, etc.) or indirectly (affixed to a frame or other structural member, "sandwiched against", etc.).

Various RF materials 206 can be placed within the cavity 210 of panel 200 to simulate real world conditions. Indeed, metallic foil or metalized film can be used along with a mesh, to reflect a portion of incident EM radiation. It is to be appreciated by those skilled in the art that the materials listed should not be considered limiting. Other suitable materials known for their EM shielding and reflective properties are fully contemplated. Examples of suitable materials may include metal/wire meshes, metal foils, metalized films (e.g., Metallized PET, BoPET (biaxially-oriented polyethylene terephthalate), to name a few.

According to one embodiment, the electromagnetic interaction simulator will also preferably be readily interchangeable with other electromagnetic interaction simulators. In particular, the panel 200 may include a user accessible internal cavity 210. In this way a first electromagnetic interaction simulator (here, RF interactive materials 206) can be swapped out and/or combined with a second electromagnetic interaction simulator (e.g., thermal or IR interactive materials). For example, according to one embodiment, panel 200 may be formed of three major components, an outer wall 202, an inner wall 204, and RF material 206, arranged in a clamshell orientation. The outer wall 202 and inner wall 204 come together and secure at their peripheral edges. In a preferred embodiment, a lip 208 runs the perimeter of the inner wall 204 providing a surface to which outer wall 202 is secured, in addition to providing sufficient space between the interior of both outer wall 202 and inner wall 204 to receive the RF material 206 (or thermal material—discussed below). Accordingly, the lip 208 may be configured as the primary structural member of the interchangeable wall (e.g., as a frame), whereas the outer wall 202 is merely a foam core adhered to the lip 208, and where the outer or exposed surface of the outer wall 202 is sceniced as desired. Further, the inner wall 204 may function primarily as a door to access, service, remove, and replace the RF material 206 as desired. The inner wall 204 may have the same or similar lightweight lip/foam core construction as the outer wall 202, as well as being sceniced if desired.

Together, when the inner wall 204 is secured to the outer wall 202, the outer wall 202, inner wall 204, and the lip 208 generally define the internal cavity 210, which may be sized to accept a selected RF material 206. The depth of cavity 210 may generally be shallow (e.g., measured in mm), but can exceed approximately five cm. Further, the cavity 210 may span the substantially the all of the interior of both outer wall 202 and inner wall 204, effectively matching the entire surface area of panel 200. This dimension can vary depending on the desired design and level of RF transparency/opacity required of the complete RHU 100. For example, RF window, ports, irregularities, etc. may be incorporated as desired.

Additionally, it is to be appreciated by those skilled in the art that the location of the lip 208 on the inner wall 204 is not to be considered limiting. A key element of the construction of panel 200 may be the ability to interchangeably incorporate various RF materials 206 into the panels, while providing the ability to reconfigure the panels as needed. For example, as above, additional supports may be used when alternating between RF materials 206 having sufficiently different physical properties.

According to one embodiment, the inner wall 204 may be secured to the outer wall 202 about the periphery of the inner wall 204, using hardware, latches, or other fasteners known in the art. In a preferred embodiment the inner wall 204 can be rotated away from the outer wall 202 in direction 212 about at least one hinge 214 that connects outer wall 202 to inner wall 204 on one side. Once the RF material 206 has been selected and inserted within the cavity 210, the user can rotate the inner wall 204 about the hinge 214 in direction 216, closing the panel 200 and securing the inner wall 204 to the outer wall 202. These steps can be accomplished very expeditiously and without disassembling any part of the RHU 100. In an alternative embodiment, the entirety of the inner wall 204 may be removable for replacement of the RF material 206.

It should be understood that, since panel 200 is used to simulate a real world wall, the RF interactive material(s) 206 may also be coordinated with the panel's outward visual appearance. For example, where panel 200 is arranged to simulate an adobe wall, RF material 206 may be selected that adequately mimic the RF response of real world adobe (e.g., reflectivity/transmittance/attenuation), with the outer wall 202 made to mimic the look or visual appearance of real world adobe (e.g., painted, textured, sceniced, etc.).

According to one embodiment, the outer wall 202 may be made to open (instead of inner wall 204 above) and/or the outer wall 202 may be otherwise detachable from the inner wall 204. Further, the RF materials 206 may be affixed directly to the movable/removable outer wall 202. In this way, the appearance (both visual and non-visible signature) of the RHU 2000 (or retrofitted a RHU 100 or RHU 120) may be varied or otherwise changed in a coordinated way, without disturbing its base structure.

Figure 40:
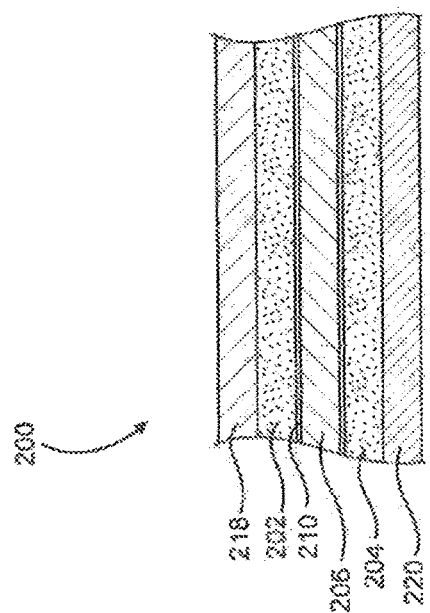
FIG. 40 is a cross section of the preferred embodiment of FIG. 38, showing the radio frequency-interactive material in the center, surrounded by the panel wall material on both sides, and the fire retardant, "sceniced" layers on the outside.

Referring now to FIG. 40, a cross section of panel 200 taken along the line 40-40 of FIG. 38 is shown. This figure depicts a cross section of outer wall 202 and inner wall 204, along with outer layers 218 and 220. Outer layers 218 and 220 are exemplary of the fire retardant layer described above, in addition to additional paint, or texturing required to "scenic" the exterior of the panels 200 for a given environment. Also shown is the RF interactive material 206 contained within the cavity 210 of the panel 200. In a preferred embodiment of the panel 200, various materials, combinations, and compositions can be accepted within the internal cavity 210 in order to manipulate, or "tune" the reflectivity and transmittance, for example, of the entire RHU 100 structure.

Figure 41:
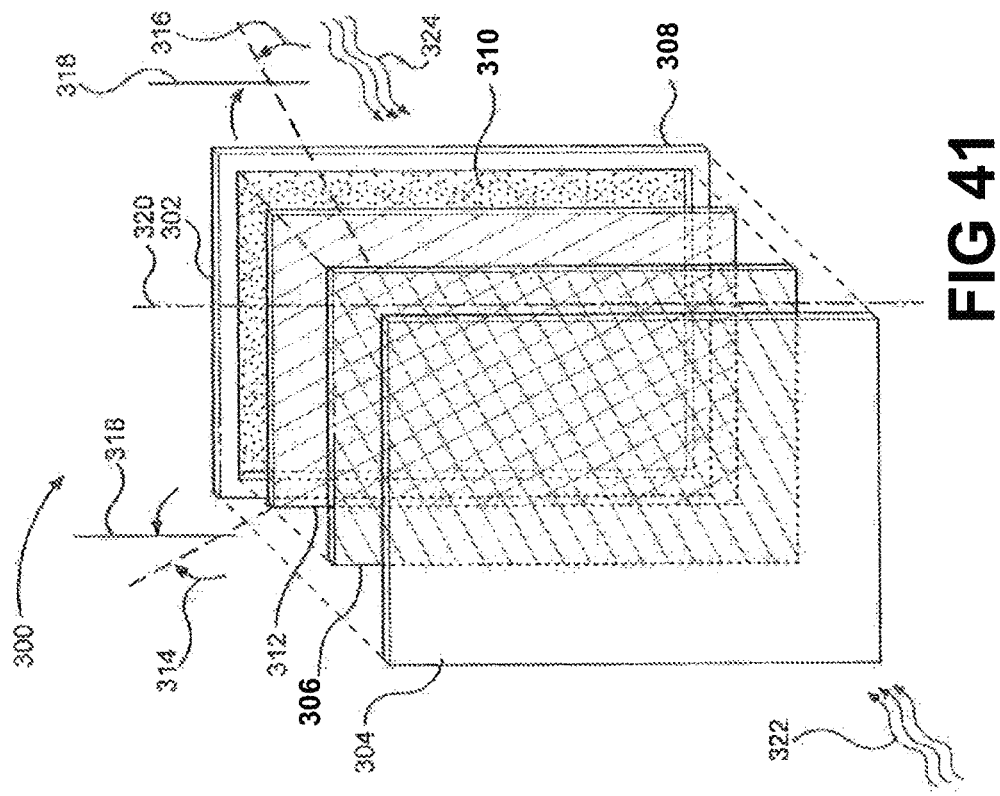
FIG. 41 is an exploded view of the construction of a preferred embodiment of FIG. 38, showing multiple layers of radio frequency-interactive materials, each with its own characteristics, allowing user configuration of the panel's radio frequency transmittance, opacity, and reflectivity.

Referring to FIG. 41, an alternative preferred embodiment of the panel of the present disclosure is shown and generally labeled 300. As shown, panel 300 may have a multiple wall, clamshell construction, having an inner wall 304 secured to an outer wall 302, having an internal cavity 308, similar to panel 200 above. In the absence of hinges (as in FIG. 38), an embodiment of panel 300 may alternatively use hardware or other suitable fasteners (not shown) to secure inner wall 304 to outer wall 302 about the peripheral edges.

According to one embodiment, outer wall 302 has a lip 306 that separates the interior surface area of outer wall 302 from that of inner wall 304, defining the internal cavity 308 to accept at least a first sheet of RF interactive material 310 and/or at least a second sheet of RF interactive material 312. It is to be appreciated by those skilled in the art that the number of sheets 310 and 312 utilized should not be considered limiting. Any practical number of materials may be used without departing from the scope and spirit of the present disclosure.

As stated above, different materials have varying effects on an incident signal. Wire mesh serves to attenuate signals creating a type of Faraday cage around a given emitter, while metal grids have been known to have EM polarizing affects. Using these characteristics, the RF material 310 and 312 can be selected and their effects "tuned" to achieve desired attenuation, more accurately modeling a real world wall constructed of adobe, wood, concrete wall, or other material, for instance.

Testing of panel 300 using a heavyweight metal mesh demonstrated an overall large attenuation over the entire span of the 0-6000 MHz emission, where the signal strength through the 14 inch adobe dropped off considerably more than the mesh above 3.5 GHz, resembling a band pass (or low-pass filter) signal response, as is known in the art. By manipulating mesh or grid configurations based on larger or smaller gauge wire, different metals or alloys such as steel, Monel, or copper, and varying wire mesh or wire grid sizes and shape, one can achieve a particular attenuation for a given frequency band and create RF or EM filters with specific transmittances over a selected band or bands of frequencies.

Moreover, polarization of the emissions is a further consideration in the "tuning" of panel 300. Polarization is the phenomenon in which waves of light or other radiation are restricted in direction of vibration. Polarization also describes the orientation of the waves' oscillations as they move through space.

In all electromagnetic radiation, the electric field is perpendicular to the direction of propagation of an EM wave. The direction of the electric field is the polarization of the wave, referenced herein as an angle from a vertical axis 318, parallel to the axis 320 of panel 300. EM radiation, including visible light, is classified in one of four polarization states: linear, circular, elliptical, and random (or unpolarized). Polarization in optics is often used to reduce visible glare, and in EM radiation it is used to control emissions in many electronic devices. For instance, in a transmitted radar signal, the polarization can be controlled for different effects.

Radar and LIDAR commonly use linear, circular, and elliptical polarization to detect certain phenomena or avoid certain types of reflections. Circular polarization, for example, is used to minimize the interference caused by rain. Also for example, linear polarization returns from an elliptical transmission often indicate metal surfaces. Similarly, random polarization returns usually indicate a fractal surface, such as rocks or soil, and are used by navigation radars.

In optics, polarizers are useful for minimizing glare from reflective surfaces, or to improve contrast and definition. The same is true for electromagnetics, and several common variations of polarizers are available, such as absorption, reflection, scattering, and birefringent polarizers. Each has its own polarization principles and can be implemented as filters to achieve a desired output. This is significant because interference only occurs when EM waves have the same frequency and polarization.

Absorption polarizers generally use dichroic crystal optics that absorb more energy in one polarization state than another (selective absorption), resulting in linear polarization. Similarly, circular dichroism ("CD") can also be employed to derive a circularly polarized EM signal. CD is the differential absorption of left and right-handed polarized EM energy, resulting in an EM wave in which the electric field of the passing wave does not change strength but only changes direction in a rotary manner about its direction of travel.

Birefringence is a property of a material having a refractive index that depends on the polarization and employs the principles of Snell's law to polarize EM radiation, based on the angle of incidence of the emitted energy through a medium, and the speed of the energy through the medium.

According to Malus' Law, offsetting two perfectly linearly polarized materials by 90 degrees (vertical and horizontal) theoretically eliminates, or filters out, any transmitted signal (radiation). Offsets more than or less than 90 degrees for two linearly polarized filters will accordingly allow some transmission base on the frequency and wavelength of the emission and coherence of the EM waves. This is known as the extinction ratio of a given polarizer: the ratio of the transmission of the unwanted component to the wanted component of the energy. This is empirically provable by turning two concentric polarized optic lenses 90 degrees to one another and looking through both. A similar effect is achievable with panel 300 by offsetting two or more polarized materials by a given angle 314 and 316. As such, tunable EM filters can be designed through adjusting the polarization type and angle of orientation of two or more overlapping materials.

According to one embodiment, the individual RF materials 310 and 312 can be polarized in different planes, as defined by angles 314 and 316, and as represented by the cross-hatching of each as shown in FIG. 41. For purposes of this disclosure, angles 314 and 316 are referenced from the vertical 318 and are representative of the diagonal lines on both RF materials 310 and 312 shown. Vertical 318 is notionally parallel to the vertical axis 320 of panel 300 and is used as a reference to maintain consistency for comparison of angles 314 and 316. RF materials 310 and 312 are contemplated to allow linear, elliptical, or circular polarization.

Depending on the training scenario as discussed above, the RF/EM emissions may be external emissions 322 radiating from the outside, into the RHU 100, or they may be internal emissions 324 radiating from within the RHU 100 toward the outside. In either case, the external emissions 322 or the internal emissions 324 each have their own polarization state, defined by their transmission source and subsequently affected or filtered as they interact with the RF panel 300 of the present disclosure.

According to one embodiment, the polarization angles 314 and 316 of RF materials 310 and 312 are graphically represented by the diagonal lines of RF materials 310 and 312. The polarization angles 314 and 316 can be manipulated to provide a specific transmittance and the ability to make a simulated brick wall made from EPS appear electromagnetically as a real wall constructed of wood, concrete, adobe, stone, brick, stucco, mortar, or other building material of interest.

According to one embodiment, the emissions 322 and 324 can also be in a left-hand or right-hand circular/elliptical polarization state. A circularly polarized EM filter can be incorporated as one of the RF materials 310 and 312, providing further ability to design a panel that adequately mimics the response of real world materials in a tactical situation.

According to alternative embodiment, a third sheet of polarizing material (not shown) is interposed between RF materials 310 and 312. For instance each of the three materials can be linearly polarized, offset by 45 degrees from the one in front of it. According to Malus' Law, the result is a polarized signal, one quarter the amplitude of the incident signal. Such a composition can lead to simple attenuation or other desired affects known in the art.

According to another alternative embodiment of panel 200 or panel 300 above, the degree of polarization, filtering, or shielding provided by RF material 206, 310, or 312 may be manipulated so as to have an inconsistent, nonlinear, or irregular RF interaction with incident RF signals. In reality, not all barriers or enclosures are uniform in construction, often presenting an irregular pattern of transmittance across the surface area of interaction with an incident signal. As such, the detected signal, or radiated signal will not be constant across a given surface, wall, or enclosure. This is tactically significant as it can reveal exploitable "weak spots" that provide a signals technician with additional information he might not otherwise receive, if the shielding were uniform. Therefore, the RF materials 206, 310, or 312 selected can be engineered to have varying effects across their own surface areas, creating exploitable "weak" spots in the barriers, for example simulating a window. Still another way to achieve the same end on a larger scale is to vary the RF materials employed from panel to panel.

Figure 42:
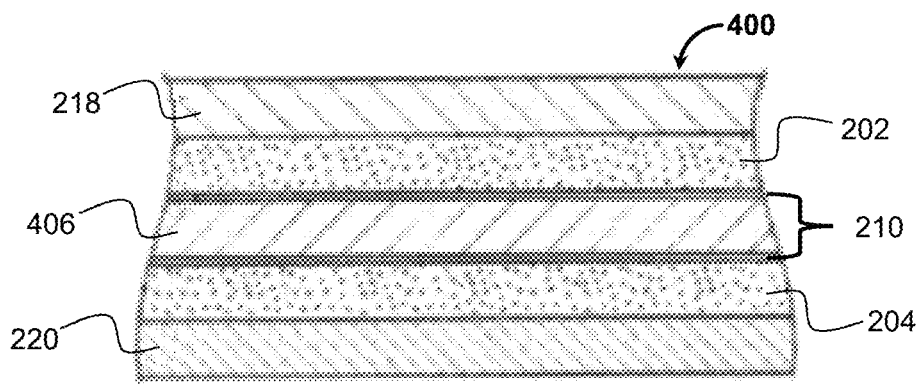
FIG. 42 is a cross section of an exemplary panel including passive features mimicking a real world building material, according to one embodiment of the present disclosure.

FIG. 42 is a cross section of an exemplary panel including passive features mimicking a real world building material, according to one embodiment of the present disclosure. As above, the panels 200, 300 may be configured to replicate or otherwise simulate a real world wall's EM characteristics or signature. Here, panel 400 may include the same or similar outer wall 202, inner wall 204, and internal cavity 210 therebetween as panel 200 (or panel 300). Likewise, panel 400 may include the outer layers 218 and 220, one or both including fire retardant, paint/texturing/"scenic" exterior, as above. Further, outer wall 202 and inner wall 204 may be separable from each other.

In addition, the panel 400 may include an interactive material 406 contained within the cavity 210, which may be selected to include properties that passively mimic or otherwise simulate one or more of a real wall's RF reflectivity/ transmittance/attenuation, thermal conductivity/thermal signature, and/or EM response/interaction/reaction in another electromagnetic domain. Examples of EM materials may include any of those described above, as well as any currently known and equivalents. Examples of thermal materials include various screens, thermal foams, metal foils, and/or any combination thereof, as well as any currently known and their equivalents.

According to one embodiment, interactive material 406 may include a plurality of individual materials or sheets, or may otherwise be a composite material. For example, one sheet may be selected for its RF properties and another sheet may be selected for its thermal properties. Beneficially, in this way, a single RF sheet/material may be inserted in the internal cavity 210 or otherwise coupled to at least one of the outer wall 202 and the inner wall 204, for training with RF equipment and then replaced with a single thermal sheet for training with thermal equipment. Further, the RF and thermal sheets may be combined, both in expected (coordinated with the visible building material) and/or unexpected (uncoordinated with the visible building materials) ways. Preferably, the interactive material 406 will be made of a lightweight material(s) where practical.

Figure 43:
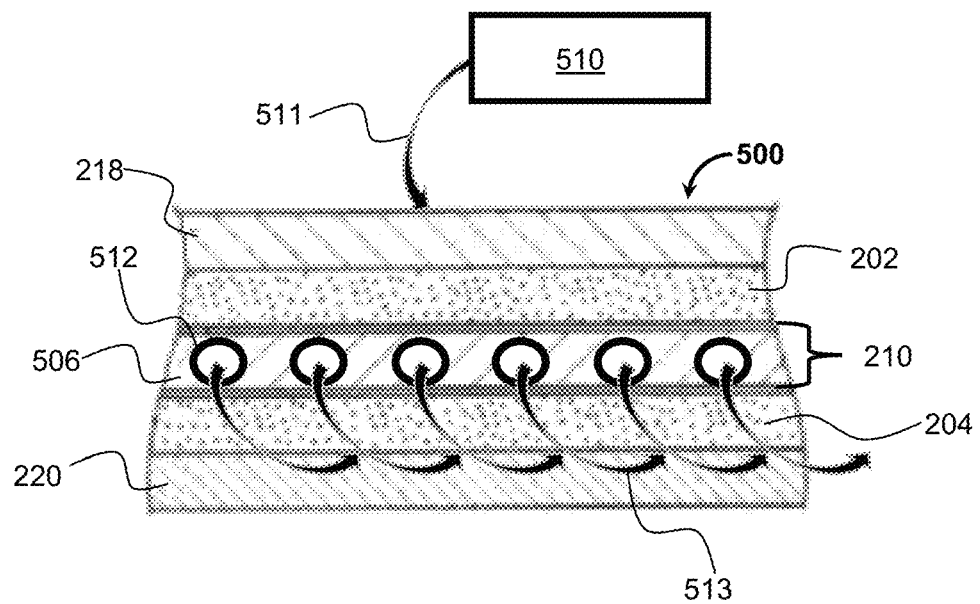
FIG. 43 is a cross section of an exemplary panel including active features mimicking a real world building material, according to one embodiment of the present disclosure.

FIG. 43 is a cross section of an exemplary panel including active features mimicking a real world building material, according to one embodiment of the present disclosure. As above, the panels 200, 300, 400 may be configured to replicate or otherwise simulate a real world wall's EM characteristics or signature. Of particular interest, the panel 500 may actively simulate real world wall's thermal characteristics or signature. Here, panel 500 may include the same or similar outer wall 202, inner wall 204, and internal cavity 210 therebetween as panel 200 (or panels 300, 400). Likewise, panel 500 may include the outer layers 218 and 220, one or both including fire retardant, paint/texturing/ "scenic" exterior, as above. Further, outer wall 202 and inner wall 204 may be separable from each other.

In addition, the panel 500 may include an interactive material 506 contained within the cavity 210, which may be configured to actively mimic or otherwise simulate one or more of a real wall's RF reflectivity/transmittance/attenuation, thermal conductivity/thermal signature, and/or EM response/interaction/reaction in another electromagnetic domain. Preferably, the panel 500 may include an interactive layer 506 "sandwiched" between the outer wall 202 and the inner wall 204, or otherwise retained within the cavity 210, and may include active features that mimic or otherwise simulate one or more of a real wall's RF reflectivity/ transmittance/attenuation, thermal conductivity/thermal signature, and/or EM response/interaction/reaction in another electromagnetic domain. Further, the interactive layer 506 contained within the cavity 210 may also include properties that passively mimic or otherwise simulate one or more of a real wall's RF reflectivity/transmittance/attenuation, thermal conductivity/thermal signature, and/or EM response/ interaction/reaction in another electromagnetic domain.

According to one embodiment, the interactive material 506 may include one or more active elements 512 configured to provide a desired thermal signature. Examples of a desired thermal signature may include thermally appearing as adobe bricks radiating heat at the end of a day, a wood structure in a winter environment that is heated from within, a generic structure having a "hot spot" such as a grow lamp, a generic structure having people inside, a generic structure having moving heat signatures representing relative motion within the structure, etc.

To illustrate, the interactive material 506 may be plumbed with, embedded with, or otherwise thermally coupled to one or more heating elements (active elements 512) configured heat at least a portion of the panel 500 and or substantially the entire panel 500. The active elements 512 may include at least one of a fluid heater (e.g., air or water), an electric heater, or any conventional heat producing element, or any combination thereof. The active element may be heated or otherwise energized by support equipment 510, which may be remote or otherwise outside of the RHU and functionally coupled via appropriate interconnections 511 (e.g., fluid conduit, support brackets, electrical connections, and communications, to name a few). The support equipment 510 may include any appropriate elements and systems that are conventionally used with heat exchange (e.g., power, control, U/I, pumps, feedback sensors, fluid reservoirs and the like).

According to one embodiment, the one or more active elements 512 may be configured to provide cooling. This may be in combination with heating, or simply cooling. This feature may be beneficial for simulating a highly insulated structure, an adobe structure that in an early morning desert environment (or other building material that acts as a heat sink during initial surface heating), cloaking training staff within the structure, and many other training scenarios. As above, heating and cooling is well-known in the art.

According to one embodiment, and as above, the panel 500 may be configured to simulate more than one characteristic of the simulated building structure component. In particular, the panel 500 may include a plurality of a plurality of individual materials or sheets, active elements, and/or may otherwise be a composite material. the panel 500 may be configured to mimic a thermal response, an RF response, and a microwave response of the simulated building structure component. To illustrate, the one or more active elements 512 may be configured to provide heating and/or cooling as described above, and the interactive material 506 may include a passive mesh that provides the proper RF response and a passive metalized foil that provides the proper EM response in another EM range. Further, and as described above, at least a portion of the interactive material 506 may be configured to be readily removable and replaceable within the internal cavity 210 so as to be reconfigurable or tunable as desired.

While there have been shown what are presently considered to be preferred embodiments of the present disclosure, it will be apparent to those skilled in the art that various changes and modifications can be made herein without departing from the scope and spirit of the disclosure. For example, according to one embodiment, any of the earlier discussed RHUs may be retrofitted with one or more of the presently discloses panels 200, 300, 400, 500. Also for example, the RHU 2000 may be embodied as a single enclosure, or as multiple enclosures. Also for example, the RHU 2000 may be provided as a kit, including a plurality of panels 200, 300, 400, 500, a plurality of interchangeable electromagnetic interaction simulator (e.g., RF Interactive materials 206, 306, 312, passive interactive material 406, Interactive layer 506, active elements 512, etc.), support equipment 510 and interconnections 512, any appropriate tooling, hardware, or packaging, and any combination thereof. In addition to the many benefits and advantages identified throughout this disclosure, many more will be readily apparent to those skilled in the art.

While the particular Relocatable Habitat Unit of the present disclosure as herein shown and disclosed in detail is fully capable of obtaining the objects and providing the advantages herein before stated, it is to be understood that it is merely illustrative of the presently preferred embodiments of the disclosure. No limitations are intended to the details of construction or design herein shown other than as described in the appended claims.

The invention claimed is:

1. A panel for simulating a building structure component made of a structural material, the panel comprising:
   an outer wall made of a lightweight material, said lightweight material being defined as lighter-in-weight than the structural material being simulated, the outer wall having an outer side and an inner side, the outer side of the outer wall configured to visually simulate the building structure component made of the structural material; and
   an electromagnetic interaction simulator removably affixed to the inner side of the outer wall, and coordinated to match at least one of a reflectivity, an absorption, and a transmittance of the simulated building structure component made of the structural material, in at least one non-visible portion of the electromagnetic spectrum, such that the panel made of the lightweight material will appear as the actual structural material both visually and in said at least one non-visual portion of the electromagnetic spectrum.

2. The panel of claim 1, further comprising an inner wall affixed to the inner side of the outer wall, substantially parallel with the outer wall, forming a cavity therebetween; and
   wherein the electromagnetic interaction simulator includes an electromagnetically interactive material that is positioned in the cavity between the inner wall and the outer wall.

3. The panel of claim 2, wherein the outer wall and the inner wall are pivotably coupled to each other, such that the inner wall can be pivoted away from the inner side of the outer wall, and provide access to remove the electromagnetic interaction simulator.

4. The panel of claim 2, wherein the electromagnetically interactive material includes a radio frequency interactive material, and the at least one non-visible portion of the electromagnetic spectrum includes a radio frequency range.

5. The panel of claim 4, wherein the radio frequency interactive material includes a metal mesh.

6. The panel of claim 4, wherein the radio frequency interactive material includes at least one at least one polarization filter.

7. The panel of claim 4, wherein the radio frequency interactive material includes at least one of a metal foil or a metalized film.

8. The panel of claim 2, wherein the electromagnetically interactive material includes a microwave frequency interactive material, and the at least one non-visible portion of the electromagnetic spectrum includes a microwave frequency range.

9. The panel of claim 2, wherein the electromagnetic interaction simulator includes a thermally interactive material, and the at least one non-visible portion of the electromagnetic spectrum includes an infrared frequency range.

10. The panel of claim 2, wherein the electromagnetic interaction simulator includes at least one active element configured to heat at least a portion of the panel, and the at least one non-visible portion of the electromagnetic spectrum includes an infrared frequency range.

11. The panel of claim 1, wherein the structural material being simulated includes at least one of adobe, stone, mud, bamboo, straw, thatch, river rock, or any combination thereof.

12. The panel of claim 1, wherein the outer wall includes at least one of a window or a door.

13. A relocatable habitat unit (RHU) simulating a building structure made of a structural material, the RHU comprising:
   a first panel including a plurality of first interlock connectors;
   a second panel including a plurality of second interlock connectors, the second panel coupleable to the first panel via at least one of the plurality of first interlock connectors and at least one of the plurality of second interlock connectors;
   a third panel including a plurality of third interlock connectors, the third panel coupleable to the second panel via at least one of the plurality of second interlock connectors and at least one of the plurality of third interlock connectors; and
   a fourth panel including a plurality of fourth interlock connectors, the fourth panel coupleable to the third panel via at least one of the plurality of third interlock connectors and at least one of the plurality of fourth interlock connectors, the fourth panel coupleable to the first panel via at least one of the plurality of first interlock connectors and at least one of the plurality of fourth interlock connectors, the fourth panel further including
      an outer wall made of a lightweight material, said lightweight material being defined as lighter-in-weight than the structural material being simulated, the outer wall having an outer side and an inner side, the outer side of the outer wall configured to visually simulate a wall made of the structural material, and
      an electromagnetic interaction simulator removably affixed to the inner side of the outer wall, and coordinated to match at least one of a reflectivity, an absorption, and a transmittance of the simulated building structure component made of the structural material, in at least one non-visible portion of the electromagnetic spectrum, such that the panel made of the lightweight material will appear as the actual structural material both visually and in said at least one non-visual portion of the electromagnetic spectrum.

14. The RHU of claim 13, further comprising:
a fifth panel configured as a floor, the fifth panel simultaneously coupleable to the first panel, the second panel, the third panel, and the fourth panel; and
a sixth panel configured as a roof, the sixth panel simultaneously coupleable to the first panel, the second panel, the third panel, and the fourth panel; and
wherein at least one to the first panel, the second panel, the third panel, and the fourth panel includes at least one of a doorway and a window.

15. The RHU of claim 14, wherein the fourth panel further includes an inner wall affixed to the inner side of the outer wall, substantially parallel with the outer wall, forming a cavity therebetween;
wherein the electromagnetic interaction simulator includes an electromagnetically interactive material that is positioned in the cavity between the inner wall and the outer wall;
wherein the outer wall and the inner wall are pivotably coupled to each other, such that the inner wall can be pivoted away from the inner side of the outer wall, and provide access to remove the electromagnetic interaction simulator;
wherein the electromagnetically interactive material includes a radio frequency interactive material, and the at least one non-visible portion of the electromagnetic spectrum includes a radio frequency range;
wherein the radio frequency interactive material includes a metal mesh;
wherein the electromagnetic interaction simulator further includes a thermally interactive material, and the at least one non-visible portion of the electromagnetic spectrum further includes an infrared frequency range; and
wherein the electromagnetic interaction simulator includes at least one active element configured to heat at least a portion of the fourth panel.

16. The RHU of claim 14, wherein the structural material being simulated includes at least one of adobe, stone, mud, bamboo, straw, thatch, river rock, or any combination thereof.

17. A kit for a relocatable habitat unit (RHU) simulating a building structure made of a structural material, the kit comprising:
a first panel including a plurality of first interlock connectors;
a second panel including a plurality of second interlock connectors, the second panel coupleable to the first panel via at least one of the plurality of first interlock connectors and at least one of the plurality of second interlock connectors;
a third panel including a plurality of third interlock connectors, the third panel coupleable to the second panel via at least one of the plurality of second interlock connectors and at least one of the plurality of third interlock connectors;
a fourth panel including a plurality of fourth interlock connectors, the fourth panel coupleable to the third panel via at least one of the plurality of third interlock connectors and at least one of the plurality of fourth interlock connectors, the fourth panel coupleable to the first panel via at least one of the plurality of first interlock connectors and at least one of the plurality of fourth interlock connectors, the fourth panel further including
an outer wall made of a lightweight material, said lightweight material being defined as lighter-in-weight than the structural material being simulated, the outer wall having an outer side and an inner side, the outer side of the outer wall configured to visually simulate a wall made of the structural material, and
an inner wall pivotably affixed to the inner side of the outer wall, and forming a cavity therebetween, such that the inner wall can be pivoted away from the inner side of the outer wall, and provide access to said cavity;
a first electromagnetic interaction simulator including a first electromagnetically interactive material that is positionable in the cavity between the inner wall and the outer wall of the fourth panel and is removably affixable to the outer wall, the first electromagnetic interaction simulator coordinated to match at least one of reflectivity, absorption, and transmittance of the simulated building structure component made of the structural material, in a first non-visible portion of the electromagnetic spectrum, such that the panel made of the lightweight material will appear as the actual structural material both visually and in said first non-visual portion of the electromagnetic spectrum; and
a second electromagnetic interaction simulator including a second electromagnetically interactive material that is positionable in the cavity between the inner wall and the outer wall of the fourth panel and is removably affixable to the outer wall, the second electromagnetic interaction simulator coordinated to simulate at least one of reflectivity, absorption, and transmittance of the simulated building structure component made of the structural material, in a second non-visible portion of the electromagnetic spectrum, such that the panel made of the lightweight material will appear as the actual structural material both visually and in said first non-visual portion of the electromagnetic spectrum; and
wherein the structural material being simulated includes at least one of adobe, stone, mud, bamboo, straw, thatch, river rock, or any combination thereof.

18. The kit of claim 17, wherein the first electromagnetically interactive material includes a first radio frequency interactive material, said first radio frequency interactive material including a metal mesh, the first non-visible portion of the electromagnetic spectrum being in radio frequency range; and
wherein the second electromagnetically interactive material includes a second radio frequency interactive material, said second radio frequency interactive material including at least one of a metal foil or a metalized film, the second non-visible portion of the electromagnetic spectrum also being in radio frequency range.

19. The kit of claim 18, further comprising a third electromagnetic interaction simulator including a third electromagnetically interactive material that is positionable in the cavity between the inner wall and the outer wall of the fourth panel, the third electromagnetic interaction simulator includes at least one active element configured to heat at least a portion of the panel, and emit heat from the outer wall of the fourth panel.

* * * * *